(12) United States Patent
Kertesz et al.

(10) Patent No.: US 11,841,297 B2
(45) Date of Patent: Dec. 12, 2023

(54) LASER ABLATION SAMPLING SYSTEM AND METHOD

(71) Applicant: UT-Battelle, LLC, Oak Ridge, TN (US)

(72) Inventors: Vilmos Kertesz, Oak Ridge, TN (US); Bernadeta R. Srijanto, Knoxville, TN (US); Charles P. Collier, Knoxville, TN (US); John F. Cahill, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/514,304

(22) Filed: Oct. 29, 2021

(65) Prior Publication Data

US 2022/0099536 A1 Mar. 31, 2022

Related U.S. Application Data

(62) Division of application No. 16/797,712, filed on Feb. 21, 2020, now Pat. No. 11,181,446.

(51) Int. Cl.
*G01N 1/04* (2006.01)
*G01N 1/38* (2006.01)
(Continued)

(52) U.S. Cl.
CPC ............ *G01N 1/04* (2013.01); *G01N 1/38* (2013.01); *H01J 49/0463* (2013.01);
(Continued)

(58) Field of Classification Search
CPC ...... G01N 1/04; G01N 1/38; G01N 2001/383; G01N 2001/045; H01J 49/164; H01J 49/0463
See application file for complete search history.

(56) References Cited

U.S. PATENT DOCUMENTS

| 8,519,330 B2 | 8/2013 | Van Berkel et al. |
| 8,637,813 B2 | 1/2014 | Van Berkel et al. |

(Continued)

OTHER PUBLICATIONS

Ovchinnikova et al, "Laser Ablation Sampling of Materials Directly into the Formed Liquid Microjunction of a Continuous Flow Surface Sampling Probe/Electrospray Ionization Emitter for Mass Spectral Analysis and Imaging", Analytical Chemistry, 2013, 85, 10211-10217 (Year: 2013).*

(Continued)

*Primary Examiner* — David E Smith
(74) *Attorney, Agent, or Firm* — FOX ROTHSCHILD LLP

(57) ABSTRACT

A method and system for sampling a solid sample material can include the step of mounting the sample material on a support. A sample surface is coated with a surface treatment composition in a dry deposition process. A solvent supply conduit for supplying solvent to the sample surface and a solvent exhaust conduit for withdrawing solvent from the sample surface can be provided. Solvent is flowed from the solvent supply conduit to the surface treatment composition and the sample surface such that the solvent contacts the surface treatment composition. A laser beam is directed from a laser source to the sample and the surface treatment composition. The laser beam will ablate the sample and the surface treatment composition in portions intersected by the laser beam. Ablated sample material enters the solvent liquid and will be transported with the solvent away from the sample surface through the solvent exhaust conduit.

13 Claims, 37 Drawing Sheets

(51) Int. Cl.
*H01J 49/16* (2006.01)
*H01J 49/04* (2006.01)

(52) U.S. Cl.
CPC ...... *H01J 49/164* (2013.01); *G01N 2001/045* (2013.01); *G01N 2001/383* (2013.01)

(56) References Cited

U.S. PATENT DOCUMENTS

| | | | |
|---|---|---|---|
| 8,742,338 B2 | 6/2014 | Van Berkel et al. | |
| 9,146,180 B2 | 9/2015 | Van Berkel et al. | |
| 2002/0187312 A1* | 12/2002 | Fonash | H01J 49/162 428/689 |
| 2003/0162179 A1 | 8/2003 | Potyrailo et al. | |
| 2012/0088066 A1 | 4/2012 | Aytug et al. | |
| 2013/0157008 A1 | 6/2013 | Aytug et al. | |
| 2013/0298701 A1* | 11/2013 | Van Berkel | H01J 49/165 73/863.11 |
| 2014/0238155 A1 | 8/2014 | Van Berkel et al. | |
| 2016/0126080 A1 | 5/2016 | Kertesz et al. | |

OTHER PUBLICATIONS

Ovchinnikova et al: Combining Laser Ablation/Liquid Phase Collection Surface Sampling and High-Performance Liquid Chromatography Electrospray Ionization Mass Spectrometry. Anal. Chem., 2011, 83, 1874-1878.

Olga S. Ovchinnikova, Matthias Lorenz, Vilmos Kertesz, Gary J. Van Berkel: Laser Ablation Sampling of Materials Directly into the Formed Liquid Microjunction of a Continuous Flow Surface Sampling Probe/Electrospray Ionization Emitter for Mass Spectral Analysis and Imaging. Anal. Chem., 2013, 85, 10211-10217.

Ovchinnikova et al. "Combining transmission geometry laser ablation and a non-contact continous flow surface ampling probe/electrospray emitter for mass spectrometry based chemical imaging", Rapid Commun. Mass Spectom., 2011, 25, 3735-3740.

* cited by examiner

LASER ABLATION SAMPLING SYSTEM AND METHOD

CROSS-REFERENCE TO RELATED APPLICATIONS

This application is a divisional application of U.S. patent application Ser. No. 16/797,712 filed Feb. 21, 2020, entitled LASER ABLATION SAMPLING SYSTEM AND METHOD" the entirety of which is hereby incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates generally to chemical analysis, and more particularly to sampling systems and methods for chemical analysis.

BACKGROUND OF THE INVENTION

In drug discovery, spatially resolved quantitation of drug-related material in dosed tissue is important information used to understand and predict pharmacological target engagement, toxicological target tissue exposure, and drug disposition, among numerous other purposes. Two of the most widely employed methods used to obtain this spatially resolved chemical information for sections are quantitative whole-body autoradiography (QWBA) and matrix-assisted laser desorption/ionization mass spectrometry (MALDI-MS). These techniques have disadvantages. QWBA is unable to distinguish between a parent drug and its metabolites and thus is not well suited alone for detailed drug and metabolite distribution studies. MALDI-MS tends to fragment fragile molecules such as phase II metabolites, and thus is not well suited for their detection. In addition, sampling and ionization processes are not separated in MALDI-MS, and it therefore lacks the capability to transfer the ablated material for post-sampling processing. For example, high-performance liquid chromatography (HPLC) separation of sampled material is advantageous in dealing with complex sample matrices and/or for separation and identification of isomeric compounds not distinguishable by MS methods alone.

The dropletProbe technique, which is a liquid extraction-based surface sampling method developed at the Oak Ridge National Laboratory (ORNL) is receiving increased attention due to its enhanced sensitivity compared with other ambient surface sampling techniques, and to its ability to integrate with HPLC/MS systems. This technique for spatially resolved sampling relies on liquid-solid extraction of material from the tissue. The typical sampling spatial resolution is 1-2 mm, or roughly equivalent to the size of traditional tissue punch samples, and thereby adequate for many relevant applications involving the examination of tissue distribution of drugs and metabolites. However, currently there is no capability to enable high spatial resolution (~200 μm diameter area and below) and sensitive chemical analysis of tissue sections that would provide absolute quantification coupled with wide chemical coverage in a robust, automated, non-labor-intensive and relatively high throughput fashion. Ways to provide this chemical information with these parameters for drug discovery are of interest to the biochemical, pharmaceutical, and medical research communities and this knowledge could impact treatment procedures and efficacy.

SUMMARY OF THE INVENTION

A method for sampling a solid sample material can include the step of mounting the sample material on a support. The sample surface is coated with a surface treatment composition in a dry deposition process. The surface treatment composition is substantially impermeable to the sample. A solvent supply conduit is provided for supplying solvent to the sample surface, and a solvent exhaust conduit is provided for withdrawing solvent from the sample surface. The solvent supply conduit is positioned in proximity to the sample surface. Solvent is flowed from the solvent supply conduit to the surface treatment composition and the sample surface. The solvent can be a weak solvent for the surface treatment composition. The solvent contacts the surface treatment composition. A laser beam is directed from a laser source to the sample and the surface treatment composition. The laser beam will ablate the sample and the surface treatment composition in portions intersected by the laser beam. Ablated sample material will enter the solvent liquid and will be transported with the solvent away from the sample surface through the solvent exhaust conduit.

The solvent supply conduit and the solvent exhaust conduit can be tubular. The solvent supply conduit and the solvent exhaust conduit can be provided by concentric tubes in a capture probe. The solvent can flow continuously from the solvent supply conduit to the solvent exhaust conduit and can form a liquid microjunction with the sample surface. The solvent supply conduit and the solvent exhaust conduit can be provided by a single tube operated in a positive pressure for solvent supply and a more negative pressure for solvent exhaust.

The dry deposition process can be at least one selected from the group consisting of dry liftoff and redeposition, atomic layer deposition, molecular layer deposition, chemical vapor deposition (CVD, including parylene CVD, initiated CVD (iCVD), oxidative CVD (oCVD), plasma-enhanced CVD (PECVD), and metal-organic CVD (MOCVD)). Other dry deposition processes are possible.

The surface treatment composition can be at least one selected from the group consisting of gold, chromium, parylenes (variety of poly(p-xylylene) polymers such as parylene-C, parylene-N), poly(tetrafluoroethylene), poly(divinyl benzene), poly(trivinyl-trimethyl cyclotrisiloxane), poly(dimethylaminomethyl styrene), poly(meta-diethynyl-benzene), and poly(thiophene). Other surface treatment compositions are possible. The solvent in one embodiment does not dissolve through the surface treatment composition for at least 10 seconds after contact between the solvent and the surface treatment composition.

The support can include a transparent portion, with a sample surface opposite the transparent portion of the support. The surface treatment composition can be in contact with the sample surface. The laser can be directed through the transparent portion of the support. The transparent support can comprise at least one selected from the group consisting of glass, poly(carbonate), quartz, and a thin membrane.

The method of the invention can further include the step of directing solvent and ablated sample material in the solvent from the solvent exhaust conduit to an analysis device. The analysis device can include at least one selected from the group consisting of a mass spectrometer, a polymerase chain reaction (PCR) device, high performance liquid chromatography with one of the following detectors: ultraviolet, visible, photo diode array, evaporative light scattering, multi-angle light scattering, mass spectrometry, chemiluminescence, optical rotation, conductivity, fluorescence, electrochemical or refractive index. Other analysis devices and methods are possible.

The invention can be utilized on many different sample materials. The sample material can include at least one selected from the group consisting of human thin tissue, animal thin tissue, plant thin tissue, fungus thin tissue, thin polymer film, and thin metal film. Other sample materials are possible.

The method can further include the step of moving the support relative to the laser source to a second location on the sample surface, and then operating the laser source to generate a laser beam to ablate sample material from the second location, and withdrawing the solvent and ablated sample into the solvent exhaust conduit. A processor can be provided and operated to control and record the position of the support relative to the laser source.

The solvent can be deposited by the solvent supply conduit as a droplet after which solvent flow is ceased. The laser source can then be operated to generate a laser beam to ablate the sample and the surface treatment composition into the droplet. The droplet containing the ablated sample and surface treatment composition can be removed through the solvent exhaust conduit.

A system for sampling a solid sample material can include a support for retaining a sample on the support. A dry process applicator can be provided for applying a coating of a surface treatment composition on the sample, the surface treatment composition being impermeable to the sample. A solvent supply conduit can be provided for supplying solvent to the sample and the surface treatment composition, the solvent being a weak solvent for the surface treatment composition. A solvent exhaust conduit can be provided for removing solvent and ablated sample from the sample surface. A laser source can be provided for directing a laser beam to the sample and the surface treatment composition, wherein the laser beam will ablate the sample and the surface treatment composition in portions intersected by the laser beam, and ablated sample material will be transported with the solvent through the solvent exhaust conduit. Other systems are possible.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
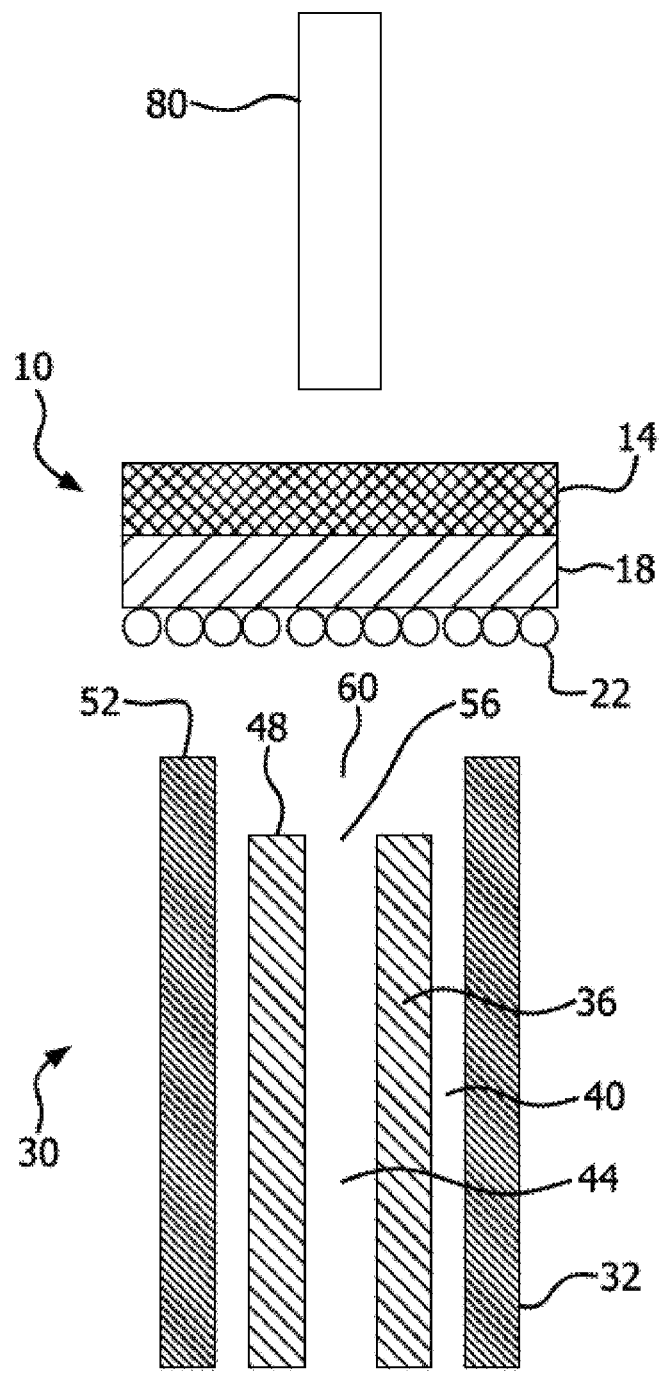
FIG. 1 is a schematic diagram illustrating an initial stage of a method according to the invention.

A method for sampling a solid sample material can include the step of mounting the sample material on a suitable support. A sample surface to be sampled is coated with a surface treatment composition in a dry deposition process. The surface treatment composition is substantially impermeable to the sample. A solvent supply conduit can be provided for supplying solvent to the sample surface. A solvent exhaust conduit can be provided for withdrawing solvent from the sample surface. The solvent supply conduit can be positioned in proximity to the sample surface. Solvent is flowed from the solvent supply conduit to the surface treatment composition and the sample surface. The solvent can be a weak solvent for the surface treatment composition. The solvent contacts the surface treatment composition. A laser beam is directed from a laser source to the sample and the surface treatment composition. The laser beam will ablate the sample and the surface treatment composition in portions intersected by the laser beam. Ablated sample material and surface treatment composition will enter the solvent liquid and will be transported with the solvent away from the sample surface through the solvent exhaust conduit.

The manner of applying and withdrawing the solvent to the coated sample surface can vary. The solvent supply conduit and the solvent exhaust conduit can be separate components, or they can be provided in a combined or single component capture probe that is operated to supply and withdraw solvent carrying sample from the sample surface. One or both solvent supply conduit and the solvent exhaust conduit can be tubular. Different sizes, geometries and configurations of the solvent supply conduit and solvent exhaust conduit are possible.

The solvent supply conduit and the solvent exhaust conduit can be provided by concentric tubes in a capture probe. Different flow paths in the capture probe are possible. In one embodiment, solvent flows continuously from the solvent supply conduit to the solvent exhaust conduit and forms a liquid microjunction with the sample surface. The solvent supply conduit and the solvent exhaust conduit can alternatively be provided by different separated tubes not within a common capture probe and operated in a positive pressure for solvent supply and a more negative pressure for solvent exhaust. The solvent supply conduit and the solvent exhaust conduit are provided by a single structure that is first operated in solvent supply mode to deposit solvent on the coated sample surface, and then operated in solvent exhaust mode after laser ablation has been performed.

The surface treatment composition is applied by a dry deposition process. A solvent deposition process for the surface treatment composition can physically alter the sample prior to and during sampling. A dry deposition process will not prematurely remove or alter the sample, and instead will apply to the sample a protective coating of the surface treatment composition. The dry deposition process that is used can vary. The dry deposition process can depend on such parameters as the nature of the sample and the solvent that are being used. The dry deposition process can be at least one selected from the group consisting of dry liftoff and redeposition, atomic layer deposition, molecular layer deposition, chemical vapor deposition (CVD, including parylene CVD, initiated CVD (iCVD), oxidative CVD (oCVD), plasma-enhanced CVD (PECVD), and metal-organic CVD (MOCVD)).

The surface treatment composition that is used can also vary depending on such parameters as the sample composition and the solvent that are used. The surface treatment composition should be only a weak solute for the solvent that is used. In one aspect, the solvent should not dissolve through the surface treatment composition layer in less than 10 seconds. The surface treatment composition layer should not dissolve upon contact with the solvent in less than 10 s, 20 s, 30 s, 40 s, 50 s, 1 min, 2 min, 3 min, 4 min, 5 min, 10 min, 20 min, 30 min, 40 min, 50 min, 1 hr, 2 hr, 3 hr, 4 hr, 5 hr, 6 hr, 7 hr, 8 hr, 9 hr, 10 hr, 11 hr, 12 hr, 13 hr, 14 hr, 15 hr, 16 hr, 17 hr, 18 hr, 19 hr, 20 hr, 21 hr, 22 hr, 23 hr and 24 hr, or in a range of any high value and low value selected from these values.

The solvent that is used can vary depending on the sample that is being extracted and in some cases the surface treatment composition that is being used. The solvent that is used does not necessarily have to dissolve the sample, a suspension or other physical extraction by the solvent is possible. Examples of suitable solvents include methanol, isopropyl alcohol, acetonitrile or water, mixed with formic acid, ammonium acetate, ammonium hydroxide, acetic acid, and ammonium formate. Mixtures of solvents or additives to the solvents are possible.

The amount of surface treatment composition that is applied can vary. The surface treatment composition should be a complete coating, without substantial gaps or breaks, to provide continuous coverage and protection. In one aspect, the coating should have a thickness of no less than 10 nm to provide that protection. The thickness of the coating can vary. The surface treatment composition layer can have a thickness of 10 nm, 20 nm, 30 nm, 40 nm, 50 nm, 60 nm, 70 nm, 80 nm, 90 nm, 100 nm, 200 nm, 500 nm, 1 µm, 2 µm, 3 µm, 4 µm, 5 µm, 6 µm, 7 µm, 8 µm, 9 µm, 10 µm, or in a range of any high value and low value selected from these values.

The surface treatment composition that is used can vary. The surface treatment composition should be capable of application by a dry deposition process. The surface treatment composition can include parylene. The surface treatment composition can comprise at least one selected from the group consisting of gold, chromium, parylenes (variety of poly(p-xylylene) polymers such as parylene-C, parylene-N), poly(tetrafluoroethylene), poly(divinyl benzene), poly(trivinyl-trimethyl cyclotrisiloxane), poly(dimethylaminomethyl styrene), poly(meta-diethynylbenzene), poly(thiophene), and mixtures thereof. Other surface treatment compositions are possible.

The characteristics and direction of the laser used to ablate the sample and the surface treatment composition can vary. The laser beam can be aimed directly at the coated sample surface, from the same side of the support in a reflective geometry, or the laser can be provided on another side of the support in a transmissive geometry. The angle of the laser beam to the coated sample surface can vary.

The orientation of the laser with respect to the sample can vary. A transmission geometry can also be used. In such a geometry, the sample is mounted to a support that is transmissive to the laser beam. An example would be a glass slide. The sample is adhered to or otherwise supported by the transmissive support, and a surface of the sample opposite to the support is coated by the surface treatment composition. The laser beam is directed through the transmissive support. The laser beam strikes and ablates the sample and the surface treatment composition coating where the beam intersects these features. The transparent support can be any suitable material, such as glass, poly(carbonate), quartz, and a thin transmissive membrane.

The sample-containing solvent is removed by the solvent exhaust conduit for analysis. The method of the invention can therefore include the step of directing solvent and ablated sample material in the solvent from the solvent exhaust conduit to an analysis device. The analysis can be any suitable chemical analysis technique. The analysis device can be a mass spectrometer. The chemical analysis device can be a polymerase chain reaction (PCR) device. Other suitable chemical analysis devices include high performance liquid chromatography with one of the following detectors: ultraviolet, visible, photo diode array, evaporative light scattering, multi angle light scattering, mass spectrometry, chemiluminescence, optical rotation, conductivity, fluorescence, electrochemical or refractive index. The solvent containing sample can also be directed by the solvent exhaust conduit to a storage container for later analysis, and possibly transport.

The system and method of the invention can be used to sample a variety of different sample substances. The sample should be capable of ablation by the laser without destruction of the analyte. The sample material can be a thin film. In one aspect, the sample material can be a thin section of human tissue. Other common sample materials include animal thin tissue, plant thin tissue, fungus thin tissue, thin polymer film, and thin metal film. The term thin as used herein means a layer thickness from 10 nm to 100 µm. Other sample materials are possible.

The method can include moving the support and sample relative to the laser source to a second location on the sample surface, and then operating the laser source to generate a laser beam to ablate sample material from the second location, and withdrawing the solvent and ablated sample into the solvent exhaust conduit. The solvent supply conduit and the solvent exhaust conduit will be positioned relative to the laser beam to supply solvent and remove sample-containing solvent. The method can further comprise the step of utilizing a processor to control and record the position of the support relative to the laser source. Multiple samples can be moved past the solvent supply conduit and the laser beam by suitable mechanisms such as robotics or conveyor equipment, and the processor can also detect and record a solvent-containing sample with a particular sample. The invention can also be utilized with nano-DESI sampling techniques.

A system for sampling a solid sample material can include a sample support for retaining a sample on the support. A dry process applicator is provided for applying a surface treatment composition to a sample on the support without a liquid solvent by a dry or solvent-free process. The surface treatment composition coating applied by the dry deposition applicator can be substantially impermeable to the sample material and to the sampling solvent. A solvent supply conduit is provided for supplying solvent to the sample and the surface treatment composition, the solvent being a weak solvent for the surface treatment composition. A solvent exhaust conduit is provided for removing solvent and ablated sample from the sample surface. A laser source is provided for directing a laser beam to the sample and the surface treatment composition, wherein the laser beam will ablate the sample and the surface treatment composition in portions intersected by the laser beam, and ablated sample material will be transported with the solvent through the solvent exhaust conduit.

Figure 2:
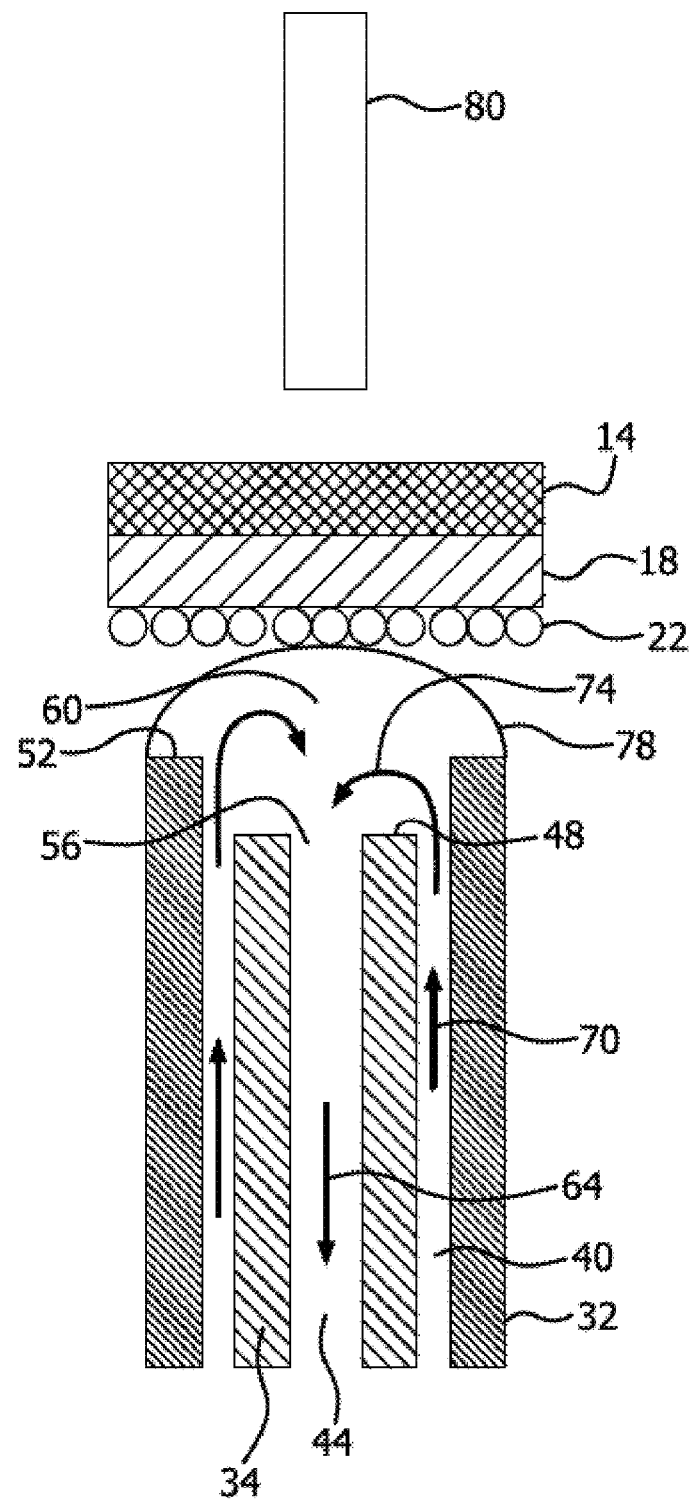
FIG. 2 is a schematic diagram illustration of the formation of a liquid dome.
Figure 3:
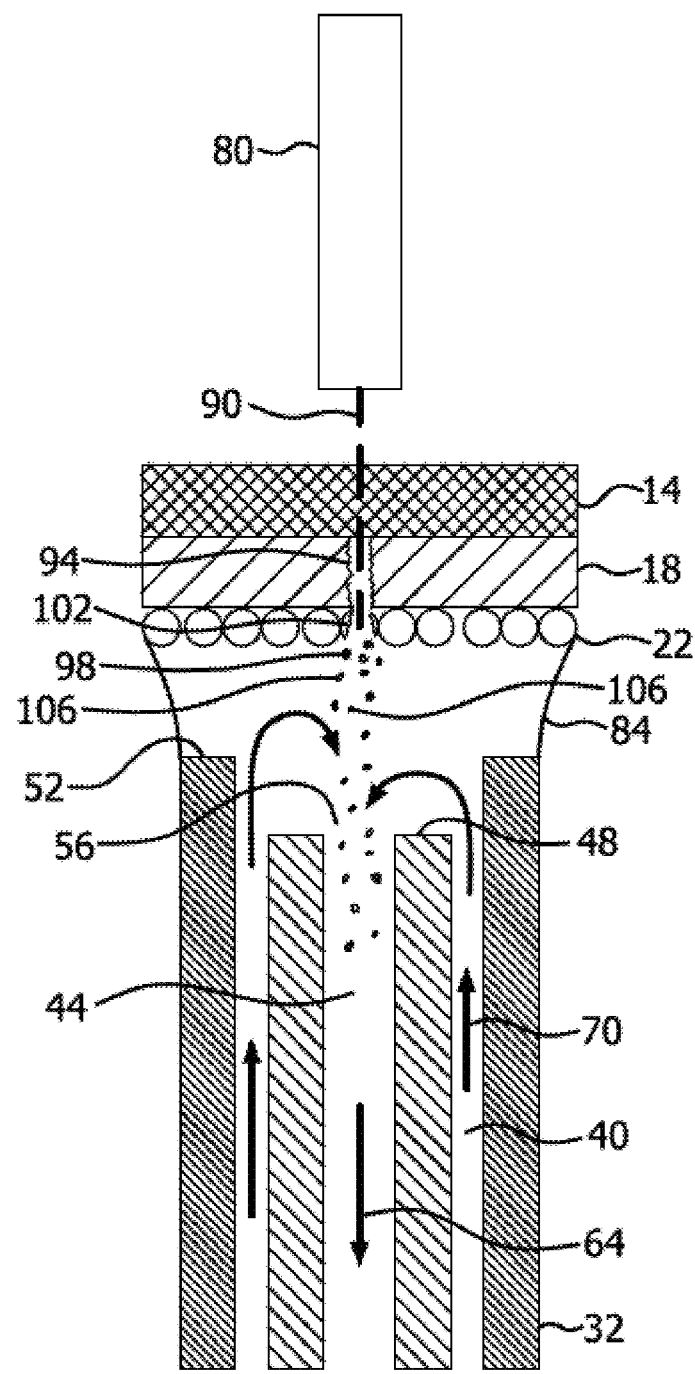
FIG. 3 is a schematic diagram of a capture probe and the formation of a liquid microjunction with a coated sample surface, and laser ablation of the coating and the sample into the liquid microjunction.

There is shown in FIGS. 1-3 a system and method according to the invention. FIG. 1 is a schematic diagram illustrating an initial stage of a method according to the invention. A sample assembly 10 includes a support 14 and a sample 18. A coating 22 of a surface treatment composition is applied to a surface of the sample 18. The support 14 is transmissive to laser light, and accordingly a laser 80 is positioned at a side of the support opposite the sample 18.

A capture probe 30 can have differing designs but in the embodiment shown has an outer conduit 32 and an inner conduit 36 arranged in a concentric or coaxial arrangement. The annular space between the inner conduit 36 and outer conduit 32 forms a solvent supply conduit 40. The interior opening of the inner conduit 36 provides a solvent exhaust conduit 44. Other arrangements are possible, for example the solvent supply conduit and the solvent exhaust conduit can be reversed or can be the same conduit. The inner conduit 36 has an end 48 defining a solvent outlet opening 56. The outer conduit 32 has an end 52 defining a solvent inlet/outlet opening 60 for the formation of a liquid microjunction.

FIG. 2 is a schematic diagram illustrating the formation of a liquid dome. Solvent from a suitable solvent supply is caused to flow through the solvent supply conduit 40 as indicated by arrow 70. A solvent exhaust pressure is applied to the solvent exhaust conduit 44 to cause solvent to flow in the direction of arrow 64. The supply and exhaust flows can be balanced such that solvent will flow from the solvent supply conduit 40 to the solvent exhaust conduit 44 as indicated by arrow 74. A liquid dome 78 can thereby be formed at the solvent inlet/outlet opening 60.

The capture probe can be brought to the sample 18. FIG. 3 is a schematic diagram of the capture probe 30 and the formation of a liquid microjunction 84 with the coated sample surface. The flow of solvent out of and back into the capture probe 30 forms the liquid microjunction and results in a flow of solvent to the sample surface, and from the sample surface back into the capture probe 30 through the solvent inlet/outlet opening 60.

The laser 80 can be operated with the microjunction in place to generate a laser beam 90. The laser beam 90 is transmitted through the transmissive support 14, and strikes and ablates both the sample 18 and the coating of surface treatment composition 22. This creates a void 94 in the sample and a void 102 in the surface treatment composition coating 22. Particles 98 of the sample 18 are ablated into the liquid microjunction 84. Particles 106 of the ablated surface treatment composition 22 are also ablated into the liquid microjunction 84. The sample particles 98 and surface treatment particles 106 are carried by the solvent flow into the solvent exhaust conduit 44 in the direction of arrow 64.

Figure 4:
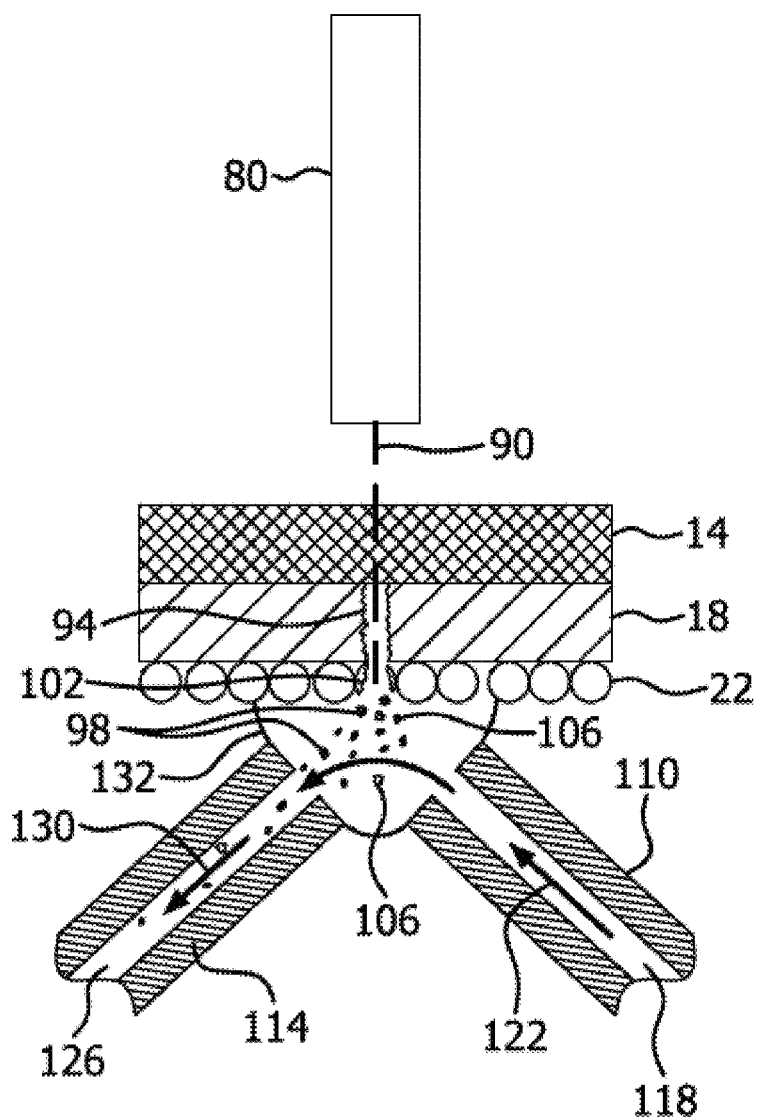
FIG. 4 is a schematic diagram of an alternative solvent supply and solvent exhaust, and the formation of a liquid microjunction with a coated sample surface, and laser ablation of the coating and the sample into the liquid microjunction.

Other capture probe arrangements are possible. FIG. 4 is a schematic diagram of an alternative solvent supply conduit 110 and solvent exhaust conduit 114. The solvent supply conduit 110 has an open interior 118 which allows for a solvent supply flow indicated by arrow 122. The solvent exhaust conduit 114 has an open interior 126 which provides for a solvent exhaust flow indicated by arrow 130. The open ends of the solvent supply conduit 110 and the solvent exhaust conduit 114 are brought into proximity to the sample surface and to each other as shown in FIG. 4. Solvent flows from the solvent supply conduit 110 and through the solvent exhaust conduit 114 can balanced to create a liquid dome 132 at the sample surface. The laser 80 is operated as previously described to generate a laser beam 90 which is transmitted through the transmissive support 14 to reach sample 18 and surface treatment composition coating 22. Particles 98 of the sample 18 and particles 106 of the surface treatment composition 22 are ablated into the liquid dome 132 and carried by the solvent exhaust flow 130 through the solvent exhaust conduit 114 in the direction of arrow 130. Other arrangements are possible.

Figure 5:
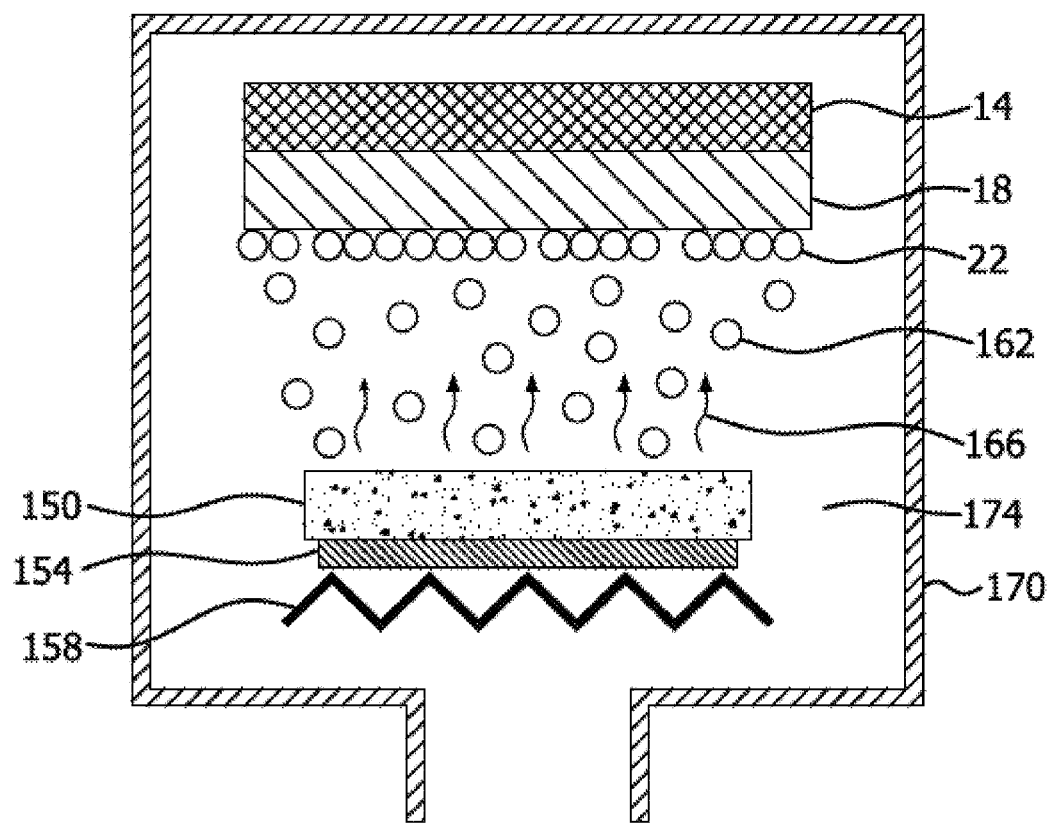
FIG. 5 is a schematic diagram of a thermal dry deposition process of a sample surface treatment composition from a solid source according to an embodiment of the invention.

The manner of coating the sample 18 with the surface treatment composition 22 can vary. FIG. 5 is a schematic diagram of a thermal dry deposition process of a sample surface treatment composition from a solid source 150 of the surface treatment composition. The solid source 150 is provided on a support 154 and heated by a heating source 158. The sample support 14 and sample 18 can be positioned within a housing 170 having an open interior 174 which can be maintained at a vacuum. The thermal heating of the solid source 150 will cause particles 162 of the surface treatment composition to be ejected in the direction of arrows 166 where they will reach the sample 18 and form the surface treatment composition coating 22.

Figure 6:
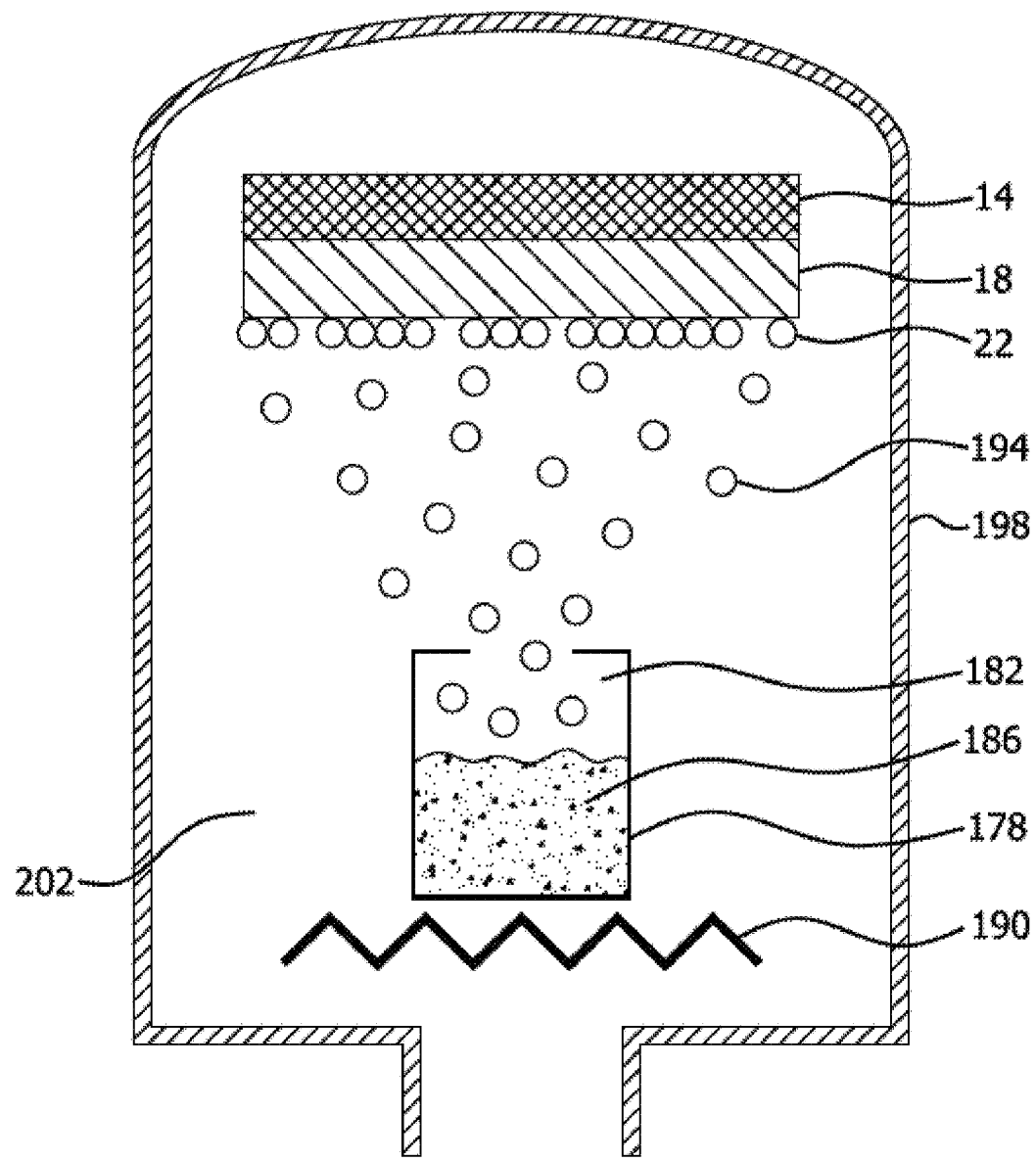
FIG. 6 is a schematic diagram of a thermal dry deposition process of a sample surface treatment composition from a liquid source.

FIG. 6 is a schematic diagram of a thermal dry deposition process of a sample surface treatment composition from a liquid source of the surface treatment composition. A container 178 with an open interior 182 can contain a liquid surface treatment composition 186 or surface treatment composition precursor. A heating source or element 190 can be provided. The sample support 14 with sample 18 can be provided and positioned within the open interior 202 of housing 198. The heating of the liquid surface treatment composition 186 will cause the evolution of particles 194 of the surface treatment composition. The particles 194 will travel to the sample 18 and will be deposited to form the surface treatment composition coating 22 on the sample 18.

Figure 7:
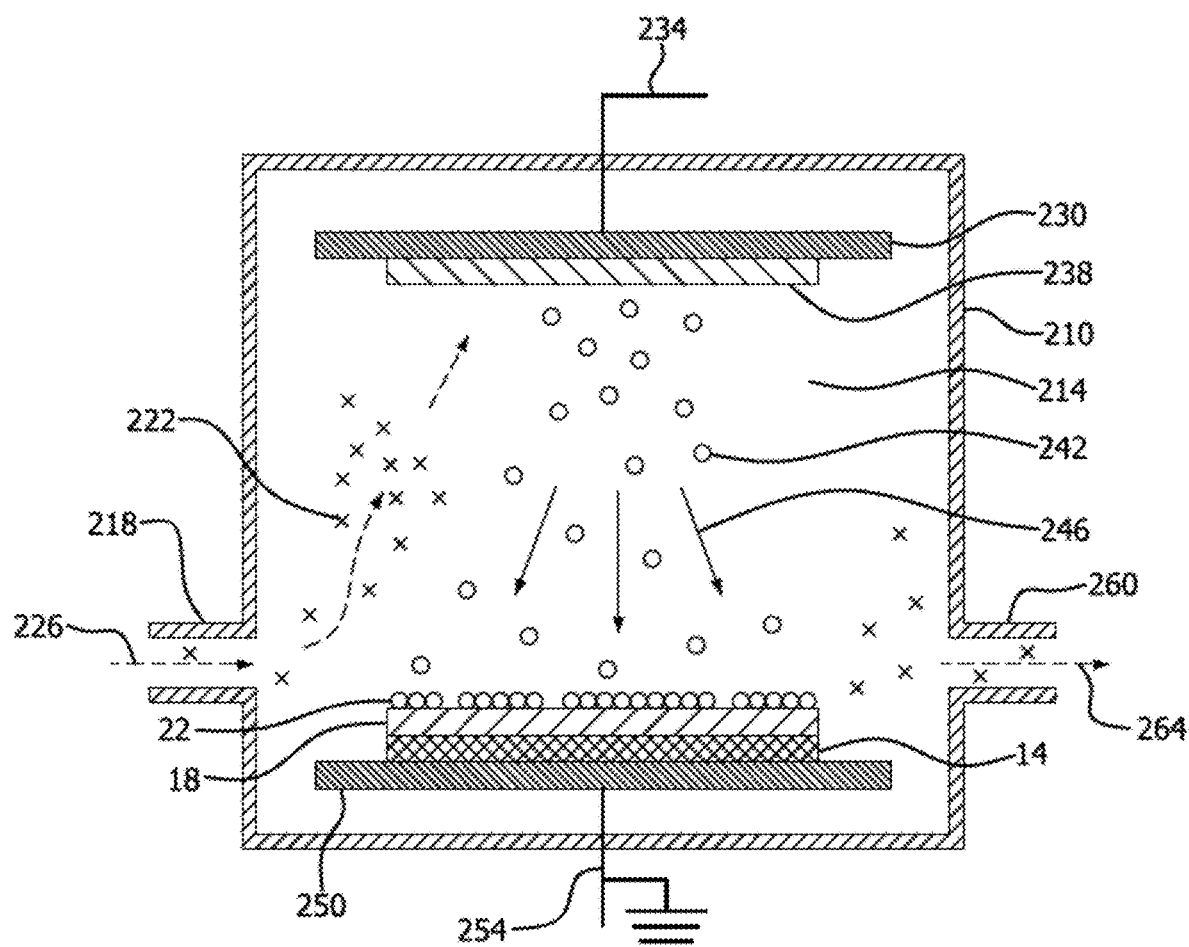
FIG. 7 is a schematic diagram of a sputtering gas dry deposition process of a sample surface treatment composition.

FIG. 7 is a schematic diagram of a sputtering gas dry deposition process of a sample surface treatment composition. A housing 210 has an open interior 214. A sputtering support 230 within the housing 210 has thereon a sputtering target 238 of the surface treatment composition or surface treatment composition precursor. An electrical connection 234 applies voltage to the sputtering support 230. The sample support 14 and sample 18 are provided on another sputtering support 250 within the housing 210. An electrical connection 254 is provided such that a voltage difference can be created between the sputtering target support 230 and the sputtering sample support 250. An inlet 218 is provided to permit the inflow of a sputtering gas as indicated by arrow 226. The sputtering gas will be ionized as is known to create ions 222 within the interior 214. These ions 222 will strike the sputtering target 238 and caused the release of surface treatment composition particles 242. The surface treatment composition particles 242 will move under the influence of the field in the direction of arrows 246 to strike and be deposited on the sample 18 as a coating 22 of the surface treatment composition. A gas exit 260 can be provided to permit the exhaustion of gas from the interior 214 as indicated by arrows 264.

Figure 8:
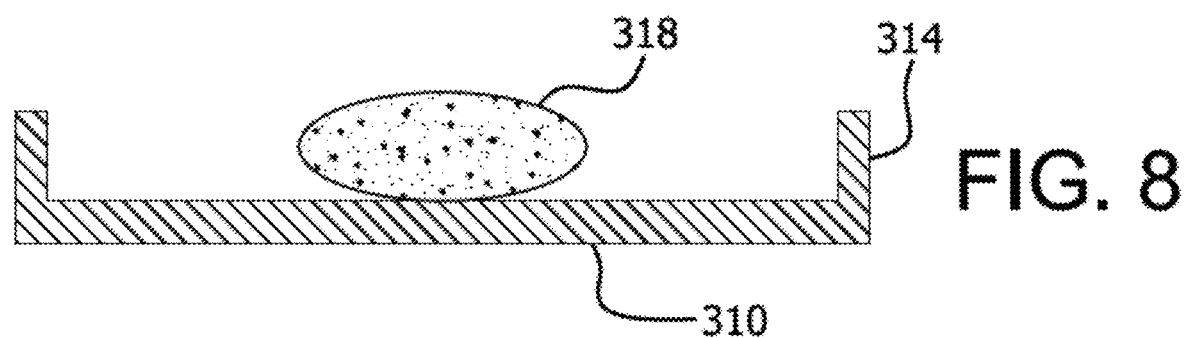
FIG. 8 is a schematic diagram of a first step of a thin film dry deposition of a surface treatment composition on a sample.
Figure 9:
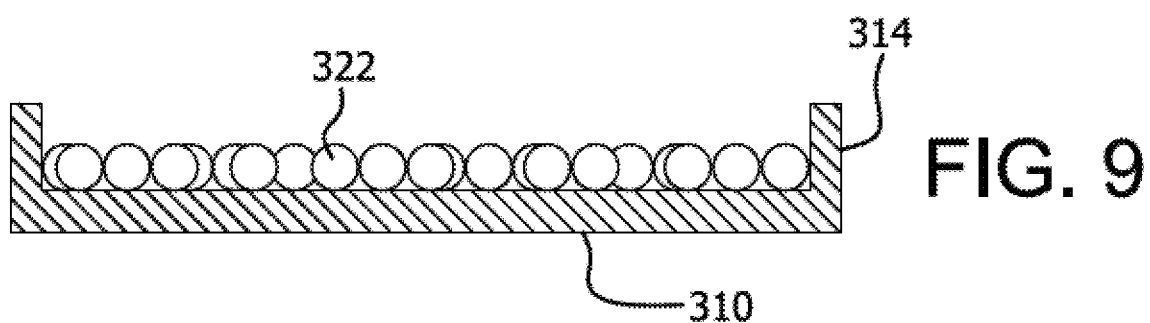
FIG. 9 is a schematic diagram of a second step of a thin film dry deposition of a surface treatment composition on a sample.
Figure 10:
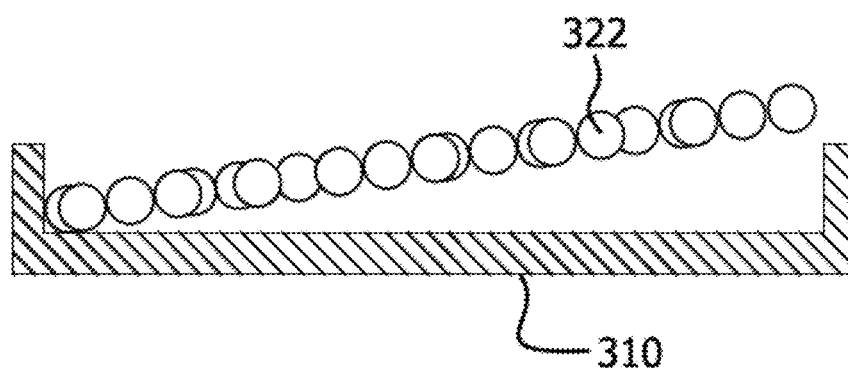
FIG. 10 is a schematic diagram of a third step of a thin film dry deposition of a surface treatment composition on a sample.
Figure 11:
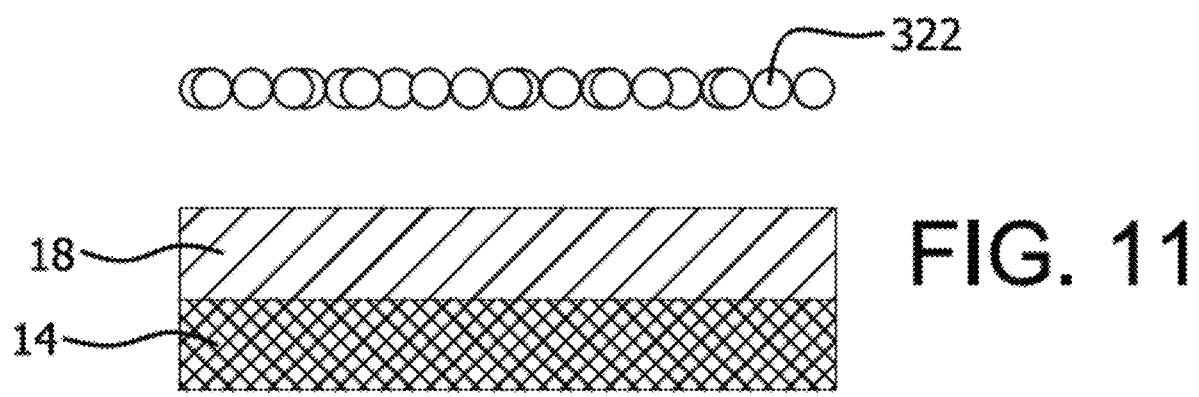
FIG. 11 is a schematic diagram of a fourth step of a thin film dry deposition of a surface treatment composition on a sample.
Figure 12:
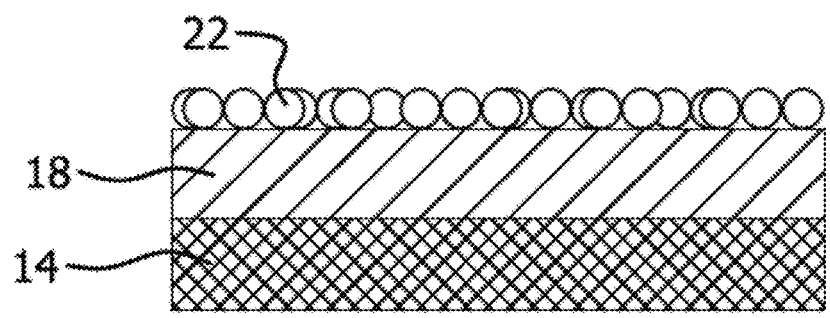
FIG. 12 is a schematic diagram of a fifth step of a thin film dry deposition of a surface treatment composition on a sample.

The surface treatment composition can be first formed as a film and then applied to the sample 18. Such a process is illustrated in FIGS. 8-12. This process begins by applying a quantity of surface treatment composition 318 to a platen 310 with sides 314 (FIG. 8). The quantity of surface treatment composition is mechanically treated as by rolling or spinning to evenly distribute the surface treatment composition into a thin film 322 (FIG. 9). The thin film 322 can then be removed from the platen 310 (FIG. 10) and positioned over the sample 18 and sample support 14 (FIG. 11). The thin film 322 can then be applied to the sample 18 on the sample support 14 to form the coating 22 of the surface treatment composition on the sample 18 (FIG. 12).

EXPERIMENTAL

Chemical and Materials. Propranolol (compound 1), propranolol-$D_7$ (compound 1a) and LC-MS grade Chromasolv® solvents water, methanol, acetonitrile (ACN), 100/0.1 (v/v) water/formic acid (FA) and 100/0.1 (v/v) ACN/FA were purchased from Sigma Aldrich (St. Louis, MO, USA). The structure, mass-to-charge ration (m/z), and origin of major product ion for propranolol (compound 1), propranolol-$D_7$ (compound 1a) and hydroxypropranolol glucuronides (compounds 2a and 2b) are shown below:

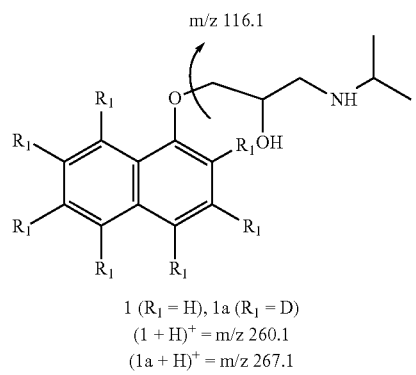

1 ($R_1$ = H), 1a ($R_1$ = D)
(1 + H)$^+$ = m/z 260.1
(1a + H)$^+$ = m/z 267.1

-continued

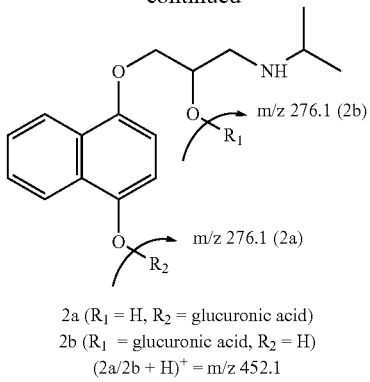

2a ($R_1$ = H, $R_2$ = glucuronic acid)
2b ($R_1$ = glucuronic acid, $R_2$ = H)
$(2a/2b + H)^+$ = m/z 452.1

Red Sharpie Ink Samples. Red Sharpie® fine point permanent marker (Sanford, Oak Brook, IL), containing the dye rhodamine B (compound 3) was purchased locally. The structure and mass-to-charge ratio of rhodamine B are shown below:

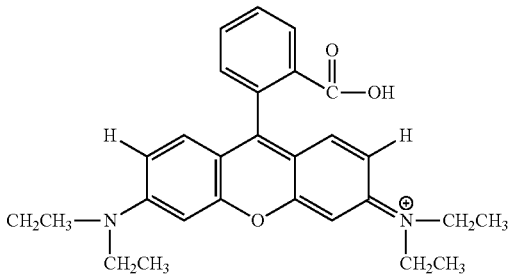 [SMILES: CCN(CC)c1ccc2c(-c3ccccc3C(=O)O)c3ccc(=[N+](CC)CC)cc-3oc2c1]

Lines of about 2 mm in diameter were drawn by hand on 1"×3" glass microscope slides (Fisher Scientific, Pittsburgh, PA) with a red Sharpie fine point permanent marker.

Tissue Preparation. Mice (male, CD-1 Charles River Laboratories, Wilmington, MA, USA) were administered a single intravenous dose of propranolol at 7.5 mg/kg in 0.9% NaCl and sacrificed at 1 hour post dose via isoflurane overdose. Brain and liver were excised, cut into small pieces, and frozen rapidly in isopentane cooled in dry ice. Tissues were stored at −70° C. until sectioning. Tissues were mounted using Tissue Tek O.C.T. compound (Fisher Scientific) and sectioned using a cryostat (model Leica 3050S, Leica Microsystems Inc., Bannockburn, IL) with the chamber temperature set at −17° C. and the object temperature set at −18° C. Serial sections 10 µm in thickness were collected onto 8210 Scotch® tape (3M, St. Paul, MN) then left on tape (for tissue punch analysis) or adhered to 1"×3" glass microscope slides for surface sampling analysis (Fisher Scientific). Tissue sections were stored at −20° C. until parylene coating. Prior to parylene coating, slides were taken out from the freezer and allowed to come to room temperature in a desiccator.

Sample Pretreatment. Coating with parylene C was carried out using a PDS 2010 Labcoter®2 (Specialty Coating Systems, Indianapolis, IN) with the vaporizer and furnace temperatures set at 175° C. and 690° C., respectively, and a chamber pressure of 30 mTorr. Film thickness was about 670 nm and about 3 µm in case of red Sharpie ink samples and tissue sections, respectively. After parylene coating, samples were stored at room temperature.

Tissue Punch Extraction and Analysis by HPLC-MS/MS. The tissue punch protocol included (a) punching out the tissue samples, (b) vortexing the sample in the extraction solvent, (c) centrifuging the extract to separate solid phases and supernatant, (d) and placing supernatant in a low volume HPLC vial. The extract was then (e) drawn into the syringe needle and (f) loaded into the sample loop followed by (g) injection for a consecutive HPLC-MS/MS analysis.

A revolving hollow hole stamp puncher acquired locally was used to create the ~2.3 mm diameter tissue punches. The tool was washed with methanol before use and air-dried. First, the tape with the tissue section was removed from the glass slide and placed on a piece of filter paper (to help cutting the tape) with the tissue facing up. After a punch was created, the tissue punch was placed in a 1 mL centrifuge tube. 500 µL of 50/50 (v/v) ACN/water containing 50 nM propranolol-$D_7$ internal standard was added and vortexed (model Vortex Genie 2 G-560, Scientific Industries, Inc., Bohemia, NY, USA) for 3 min followed by centrifuging (model Eppendorf Centrifuge 5415 C, Brinkmann Instruments, Inc., Westbury, NY, USA) for 4 minutes at 3000 rpm. 200 µL of supernatant was placed in an HPLC low volume (250 µL) vial. 5 µL samples were drawn then into the syringe of a HTS PAL autosampler (LEAP Technologies Inc., Carrboro, NC, USA) injected onto a Synergi Hydro-RP HPLC column (50×2 mm, 4 µm particle size; Phenomenex, Torrance, CA, USA) for subsequent HPLC/MS analysis employing an Agilent 1100 HPLC pump to deliver the separation solvents (Agilent Technologies, Santa Clara, CA, USA) coupled to an API 5500 triple quadrupole mass spectrometer (AB SCIEX, Concord, Ontario, Canada). HPLC separation solvents A and B were 100/0.1 (v/v) water/FA and 100/0.1 (v/v) ACN/FA, respectively. The 8-min long gradient separation included the following steps: 0-0.5 min: 90% A; 0.5-3 min: linear gradient to 35% A; 3-3.5 min: linear gradient to 10% A; 3.5-3.6 min: linear gradient to 90% A; and 3.6-8 min: 90% A. Solution flow rate was 200 µL/min. Selected reaction monitoring (SRM) transitions of m/z 260.1→116.1 for cpd 1, m/z 267.1→116.1 for compound 1a and m/z 452.1→276.1 for hydroxypropranolol glucuronides compounds 2a and 2b were monitored using positive ion mode electrospray ionization (ESI) with an emitter voltage of 5.0 kV and employing a collision energy (CE) of 25 eV (compounds 1 and 1a) or 35 eV (compounds 2a and 2b) and a declustering potential (DP) of 60 V. Dwell time was 50 ms for each transition monitored. Turbo sprayer heater temperature was 300° C.

Operation of the Laser Ablation/Liquid Microjunction Capture Sampling System. A laser capture microdissection system (LMD 7, Leica Microsystems, Wetzel, Germany) utilized in laser ablation mode was used. A PEEK tube (0.007" ID and 1/16" OD) was originated from the waste port of the valve of the HTS PAL autosampler and was held in place under the sample with the end of the tube protruding the collection device. The operation of the LMD and the autosampler systems were controlled by in house developed (LMD Assistant and DropletProbe Premium, respectively) software.

Red Sharpie Ink Sampling and Analysis by Laser Ablation/Liquid Microjunction Capture Sampling HPLC-MS/MS. 50×50 µm area of parylene C coated red Sharpie ink with rhodamine B was laser ablated into the liquid microjunction created by 2 µL of 90/10/0.1 (v/v/v) water/ACN/FA and then drawn then into the syringe of the HTS PAL autosampler and injected onto the Synergi Hydro-RP HPLC column for subsequent HPLC/MS analysis employing an Agilent 1100 HPLC pump to deliver the separation solvents coupled to an API 5500 triple quadrupole mass spectrometer. HPLC separation solvent was 50/50/0.1 (v/v/v) water/ACN/FA using a 15-min long isocratic separation. Solution flow rate was 200 µL/min. Rhodamine B was monitored by SRM transition of m/z 443.2→399.2 using positive ion mode ESI with an emitter voltage of 5.0 kV and employing a CE of 55 eV and a DP of 80 V. Dwell time was 50 ms. Turbo sprayer heater temperature was 300° C.

Figure 13:
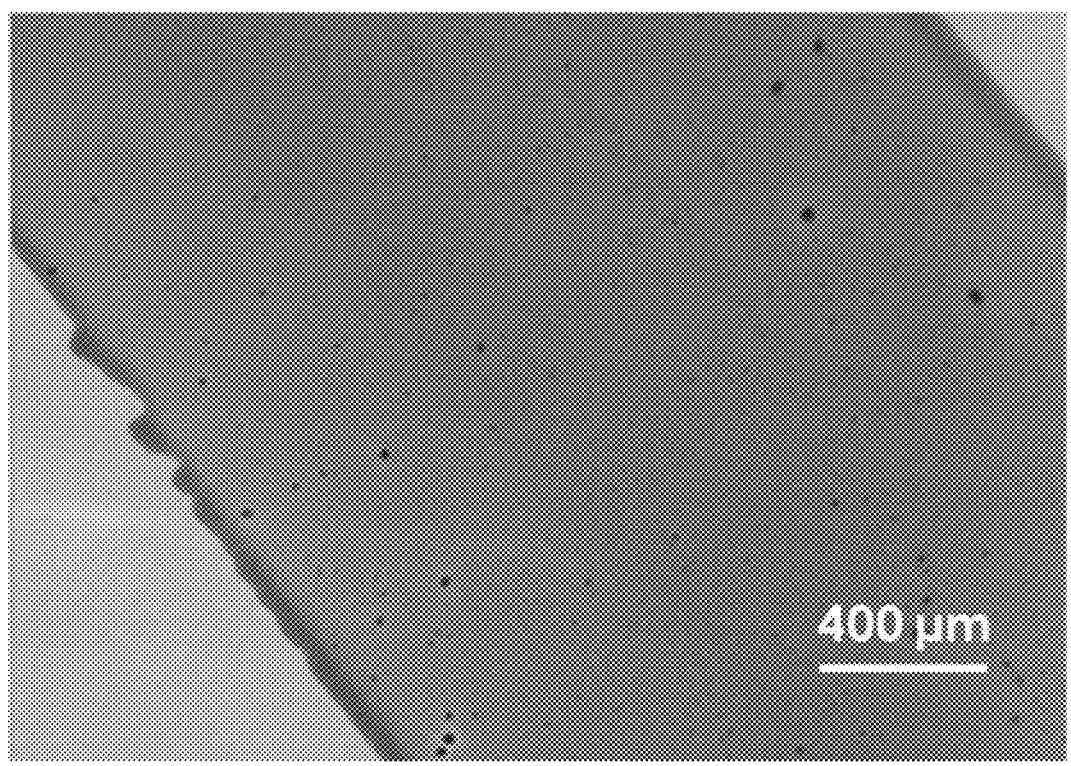
FIG. 13 is an optical image of an area containing rhodamine B dye on a glass microscope slide sample coated with about a 630-nm-thick layer of parylene.
Figure 14:
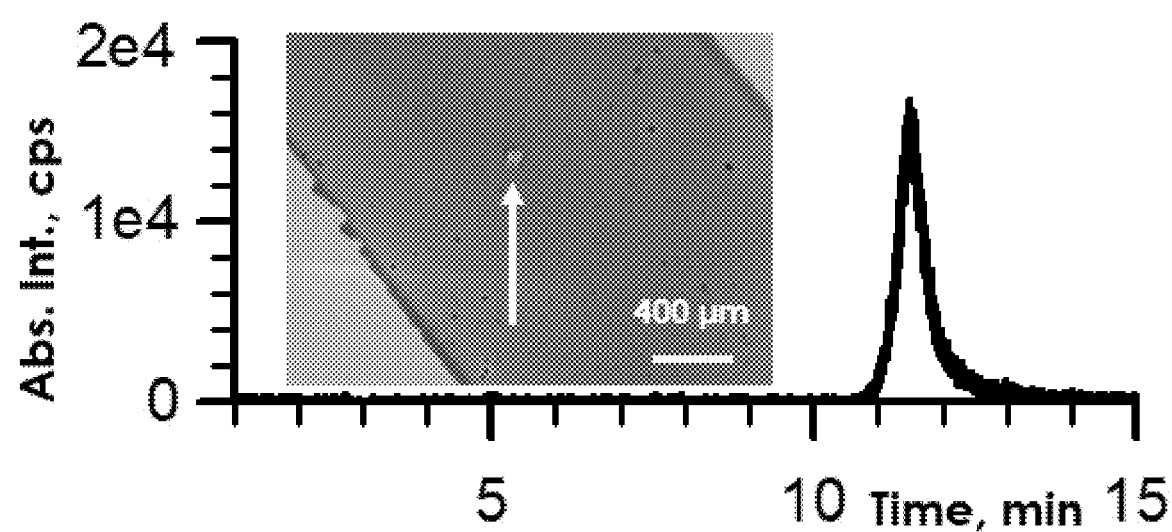
FIG. 14 is an extracted ion chromatogram of m/z 443.2→399.2 corresponding to rhodamine B sampled at a 50×50 µm laser ablated area indicated by the arrow in the inset image. The laser ablated particles were collected in the liquid microjunction.
Figure 15:
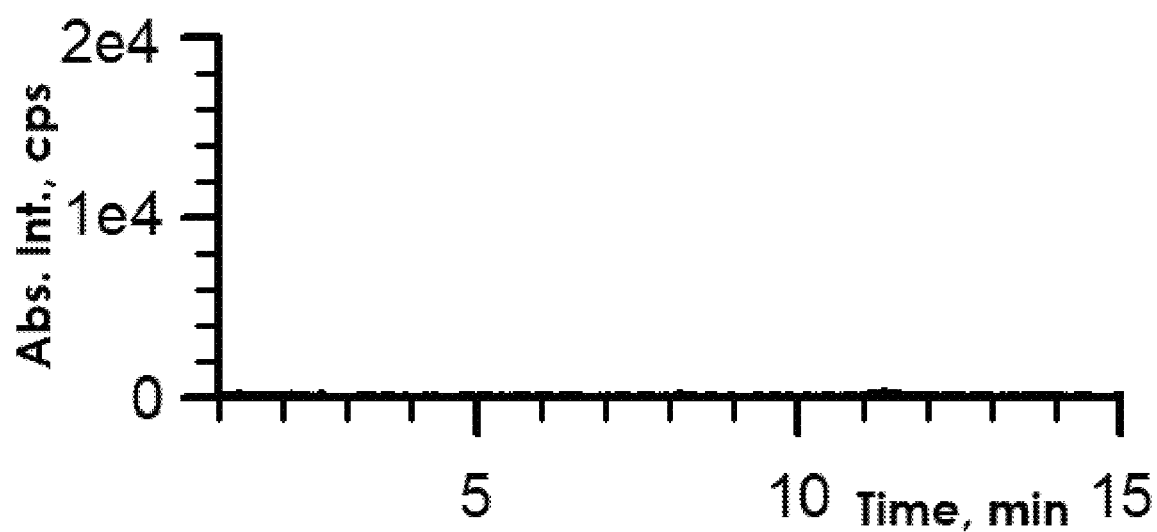
FIG. 15 is an extracted ion chromatogram of m/z 443.2→399.2 corresponding to rhodamine B sampled in the same area of FIG. 14 by liquid microjunction but without laser ablation into the liquid microjunction.
Figure 16:
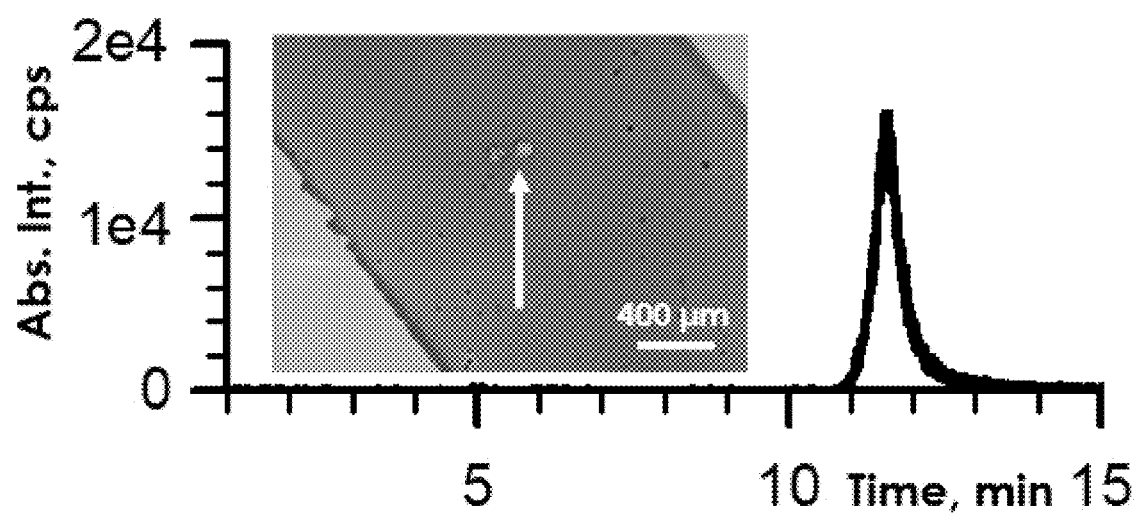
FIG. 16 is an extracted ion chromatogram of m/z 443.2→399.2 corresponding to rhodamine B sampled at another 50×50 µm laser ablated area indicated by the arrow in the inset image. The laser ablated particles were collected in the liquid microjunction.
Figure 17:
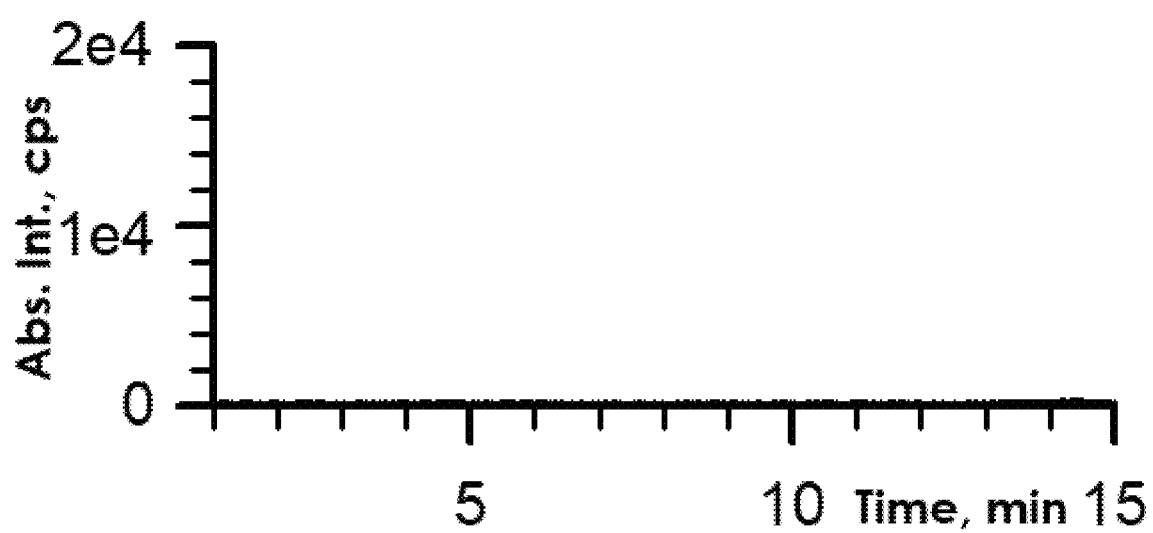
FIG. 17 is an extracted ion chromatogram of m/z 443.2→399.2 corresponding to rhodamine B sampled in the same area of FIG. 16 by liquid microjunction but without laser ablation into the liquid microjunction.

FIG. 13 is an optical image of an area containing rhodamine B dye on a glass microscope slide sample coated with about 630 nm of parylene. FIG. 14 is an extracted ion chromatogram of m/z 443.2→399.2 corresponding to rhodamine B sampled at a 50×50 µm laser ablated area indicated by the arrow in the inset optical image and the laser ablated particles were collected in the liquid microjunction. FIG. 15 is an extracted ion chromatogram of m/z 443.2→399.2 corresponding to rhodamine B sampled in the same area of FIG. 14 by liquid microjunction but without laser ablation into the liquid microjunction. FIG. 16 is an extracted ion chromatogram of m/z 443.2→399.2 corresponding to rhodamine B sampled at another 50×50 µm laser ablated area indicated by the arrow in the inset optical image and the laser ablated particles were collected in the liquid microjunction. FIG. 17 is an extracted ion chromatogram of m/z 443.2→399.2 corresponding to rhodamine B sampled in the same area of FIG. 16 by liquid microjunction but without laser ablation into the liquid microjunction. FIGS. 14-17 indicate successful liquid microjunction sampling of the analyte with laser ablation and lack of analyte signal without laser ablation.

Thin Tissue Sampling and Analysis by Laser Ablation/Liquid Microjunction Capture Sampling HPLC-MS/MS. 200×200 µm area of parylene C coated thin sections of mouse liver or brain was laser ablated into the liquid microjunction created by 2 µL of 90/10/0.1 (v/v/v) water/ACN/FA and then drawn then into the syringe of the HTS PAL autosampler and injected onto the Synergi Hydro-RP HPLC column for subsequent HPLC/MS analysis employing an Agilent 1100 HPLC pump to deliver the separation solvents coupled to an API 5500 triple quadrupole mass spectrometer. The HPLC-MS/MS analysis utilized the same settings as described above for the tissue punch analysis.

Figure 18:
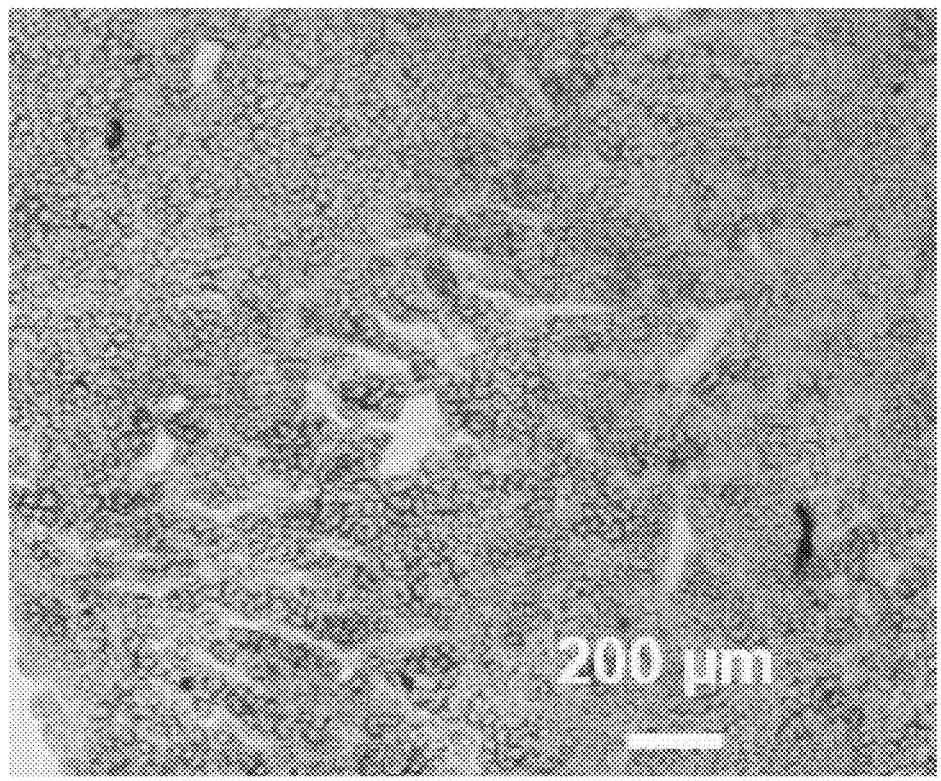
FIG. 18 is an optical image of a propranolol-dosed 10-µm-thick mouse liver section before laser ablation.
Figure 19:
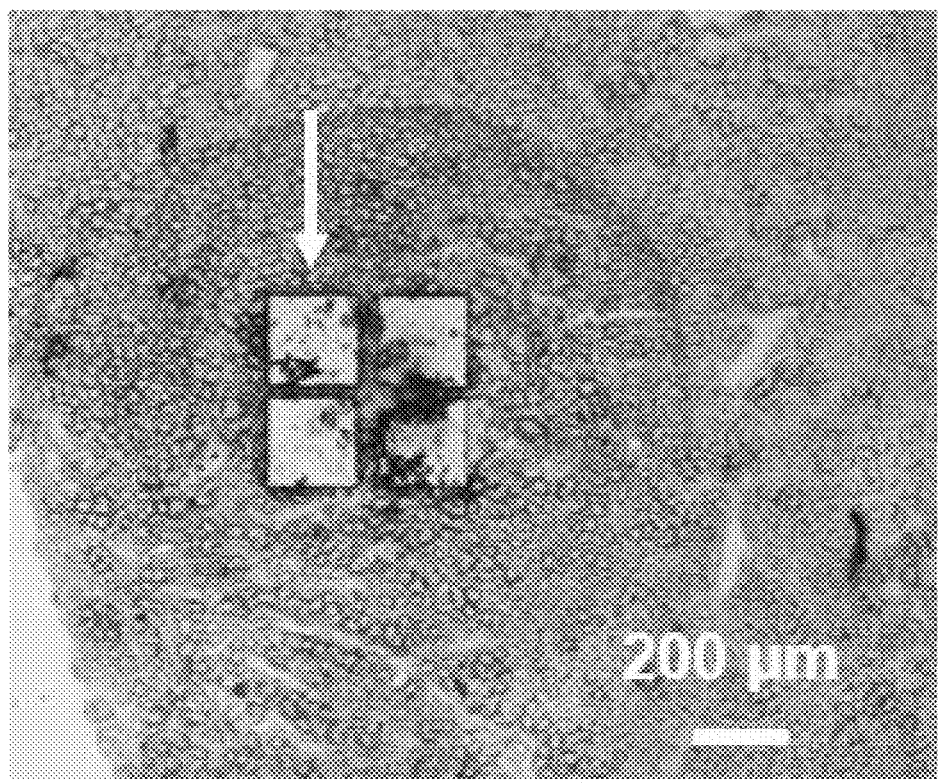
FIG. 19 is an optical image of a propranolol-dosed 10-µm-thick mouse liver section after four consecutive laser ablation-liquid microjunction analysis.
Figure 20:
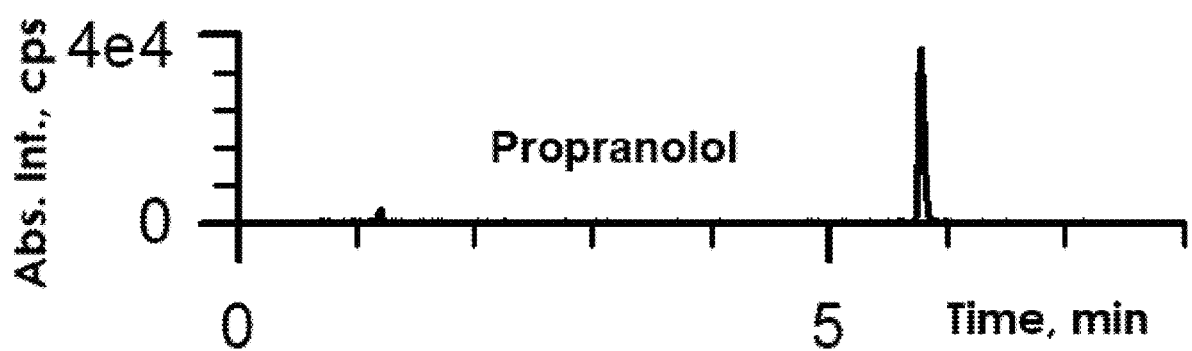
FIG. 20 is an extracted ion chromatogram of m/z 260.1→116.1 corresponding to propranolol (compound 1) when analyzed from a 200×200 µm laser ablated area shown by the arrow in FIG. 19.
Figure 21:
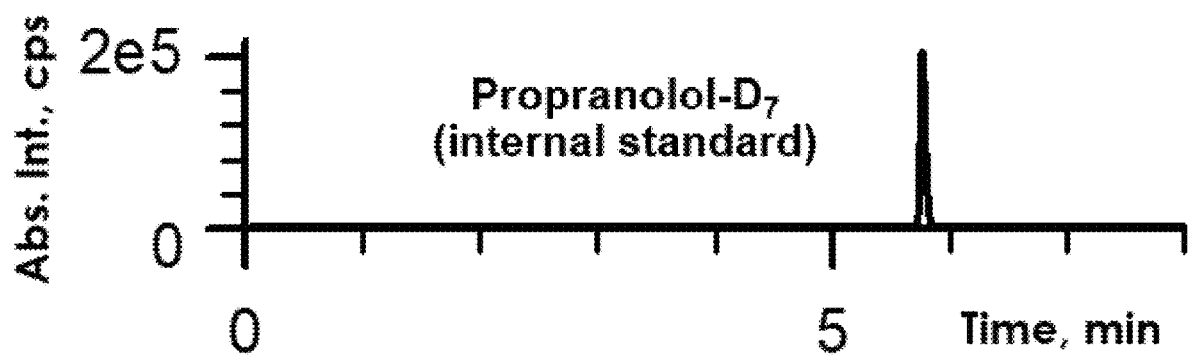
FIG. 21 is an extracted ion chromatogram of m/z 267.1→116.1 corresponding to internal standard propranolol $D_7$ (compound 1a) when analyzed from a 200×200 µm laser ablated area shown by the arrow in FIG. 19.
Figure 22:
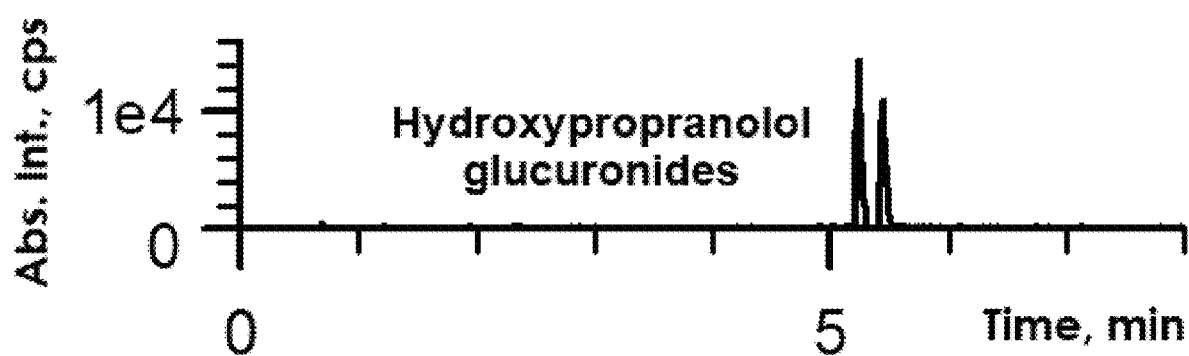
FIG. 22 is an extracted ion chromatogram of m/z 452.1→276.1 corresponding to two different forms of phase II metabolite hydroxyl propranolol glucuronide (compounds 2a and 2b) when analyzed from a 200×200 µm laser ablated area shown by the arrow in FIG. 19.

FIG. 18 is an optical image of a propranolol-dosed 10-µm-thick mouse liver section before laser ablation. FIG. 19 is an optical image of a propranolol-dosed 10-µm-thick mouse liver section after four consecutive laser ablation-liquid microjunction analysis. FIG. 20 is an extracted ion chromatogram of m/z 260.1→116.1 corresponding to propranolol (compound 1) when analyzed from a 200×200 µm laser ablated area shown by the arrow in FIG. 19. FIG. 21 is an extracted ion chromatogram of m/z 267.1→116.1 corresponding to internal standard propranolol-$D_7$ (compound 1a) when analyzed from a 200×200 µm laser ablated area shown by the arrow in FIG. 19. FIG. 22 is an extracted ion chromatogram of m/z 452.1→276.1 corresponding to two different forms of phase II metabolite hydroxyl propranolol glucuronide (compounds 2a and 2b) when analyzed from a 200×200 µm laser ablated area shown by the arrow in FIG. 19.

Figure 23:
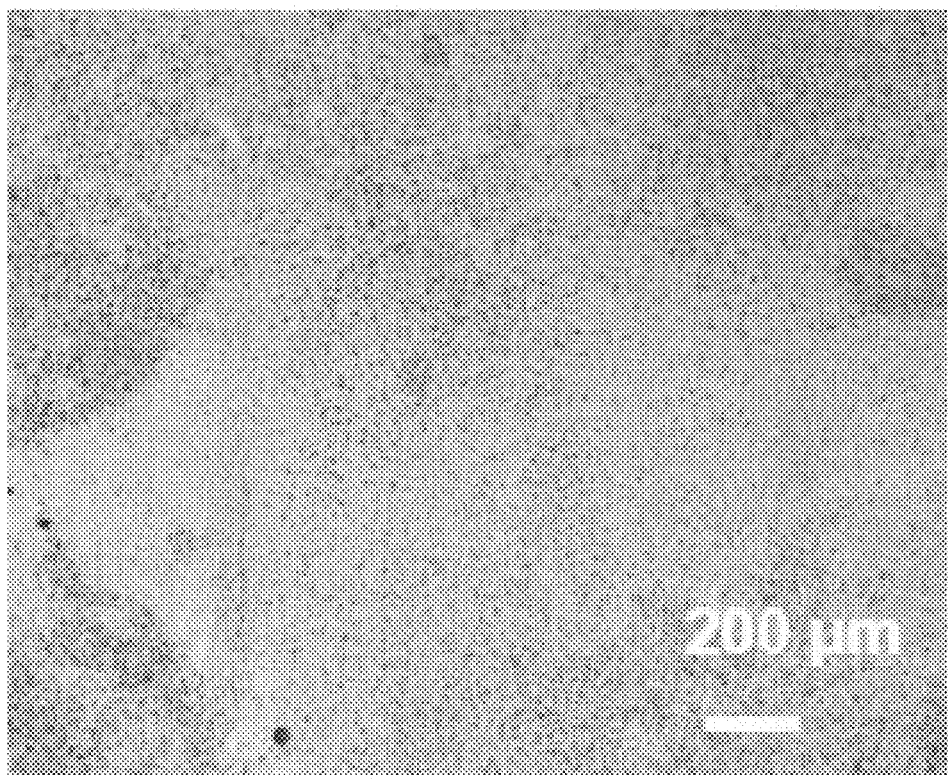
FIG. 23 is an optical image of a propanol-dosed 10-μm thick mouse brain section before laser ablation.
Figure 24:
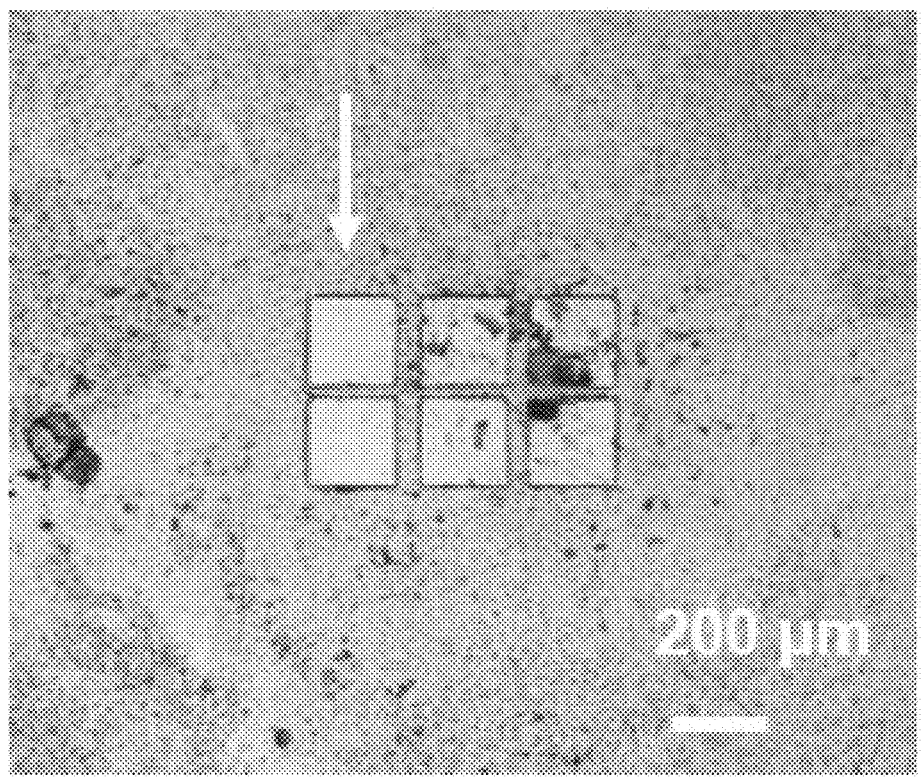
FIG. 24 is an optical image of a propanol-dosed 10-μm thick mouse brain section after six consecutive laser ablation-liquid microjunction analysis.
Figure 25:
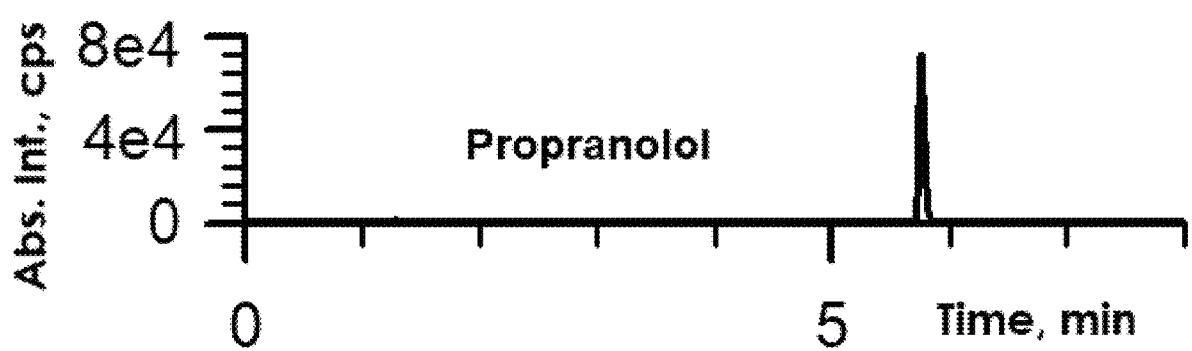
FIG. 25 is an extracted ion chromatogram of m/z 260.1→116.1 corresponding to the drug propranolol (compound 1) when analyzed from a 200×200 μm laser ablated area shown by the arrow in FIG. 24.
Figure 26:
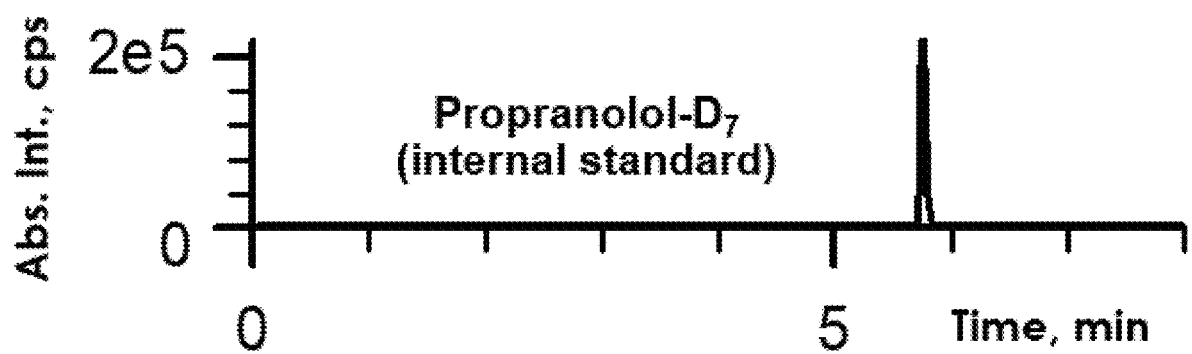
FIG. 26 is an extracted ion chromatogram of m/z 267.1→116.1 corresponding to internal standard propranolol-$D_7$ (compound 1a) when analyzed from a 200×200 μm laser ablated area shown by the arrow in FIG. 24.
Figure 27:
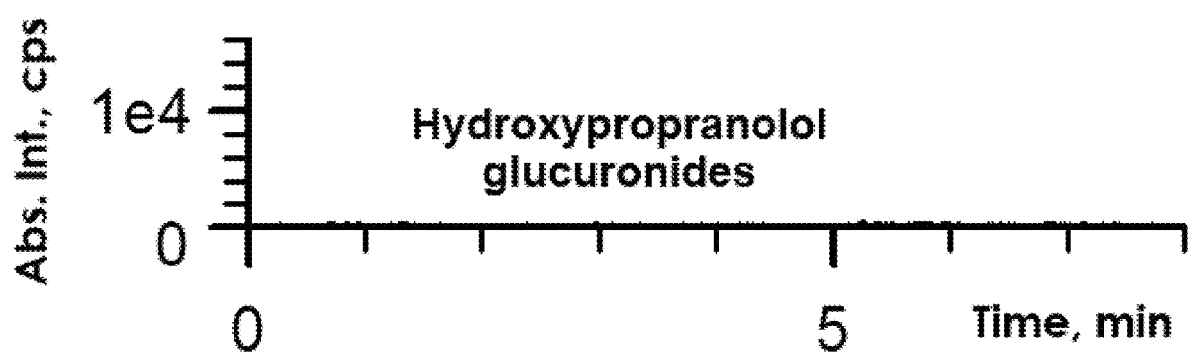
FIG. 27 is an extracted ion chromatogram of m/z 452.1→276.1 corresponding to two different forms of phase II metabolite hydroxypropranolol glucuronide (compounds 2a and 2b) when analyzed from a 200×200 μm laser ablated area shown by the arrow in FIG. 24.

FIG. 23 is an optical image of a propanol-dosed 10-µm thick mouse brain section before laser ablation. FIG. 24 is an optical image of a propanol-dosed 10-µm thick mouse brain section after six consecutive laser ablation-liquid microjunction analysis. FIG. 25 is an extracted ion chromatogram of m/z 260.1→116.1 corresponding to the drug propranolol (compound 1) when analyzed from a 200×200 µm laser ablated area shown by the arrow in FIG. 24. FIG. 26 is an extracted ion chromatogram of m/z 267.1→116.1 corresponding to internal standard propranolol-$D_7$ (compound 1a) when analyzed from a 200×200 µm laser ablated area shown by the arrow in FIG. 24. FIG. 27 is an extracted ion chromatogram of m/z 452.1→276.1 corresponding to two different forms of phase II metabolite hydroxypropranolol glucuronide (compounds 2a and 2b) when analyzed from a 200×200 µm laser ablated area shown by the arrow in FIG. 24.

The table below shows the calculated propranolol concentrations determined in different animals and tissues using tissue punch analysis using d=2.3 mm diameter tissue areas and laser ablation/liquid microjunction capture sampling using 200×200 µm laser ablated tissue areas. The results show good agreement and the applicability of the laser ablation/liquid microjunction capture sampling for absolute quantitation at this high resolution.

| Tissue | Tissue punch d = 2.3 mm (nmol/g tissue) | Laser ablation/liquid Microjunction capture 200 × 200 µm (nmol/g tissue) |
| --- | --- | --- |
| Liver (mouse2) | 20.2-2.3 | 20.4-5.2 |
| Brain (mouse1) | 68.1-4.0 | 61.6-2.9 |
| Brain (mouse2) | 65.9-6.8 | 67.4-30.3 |

Figure 28:
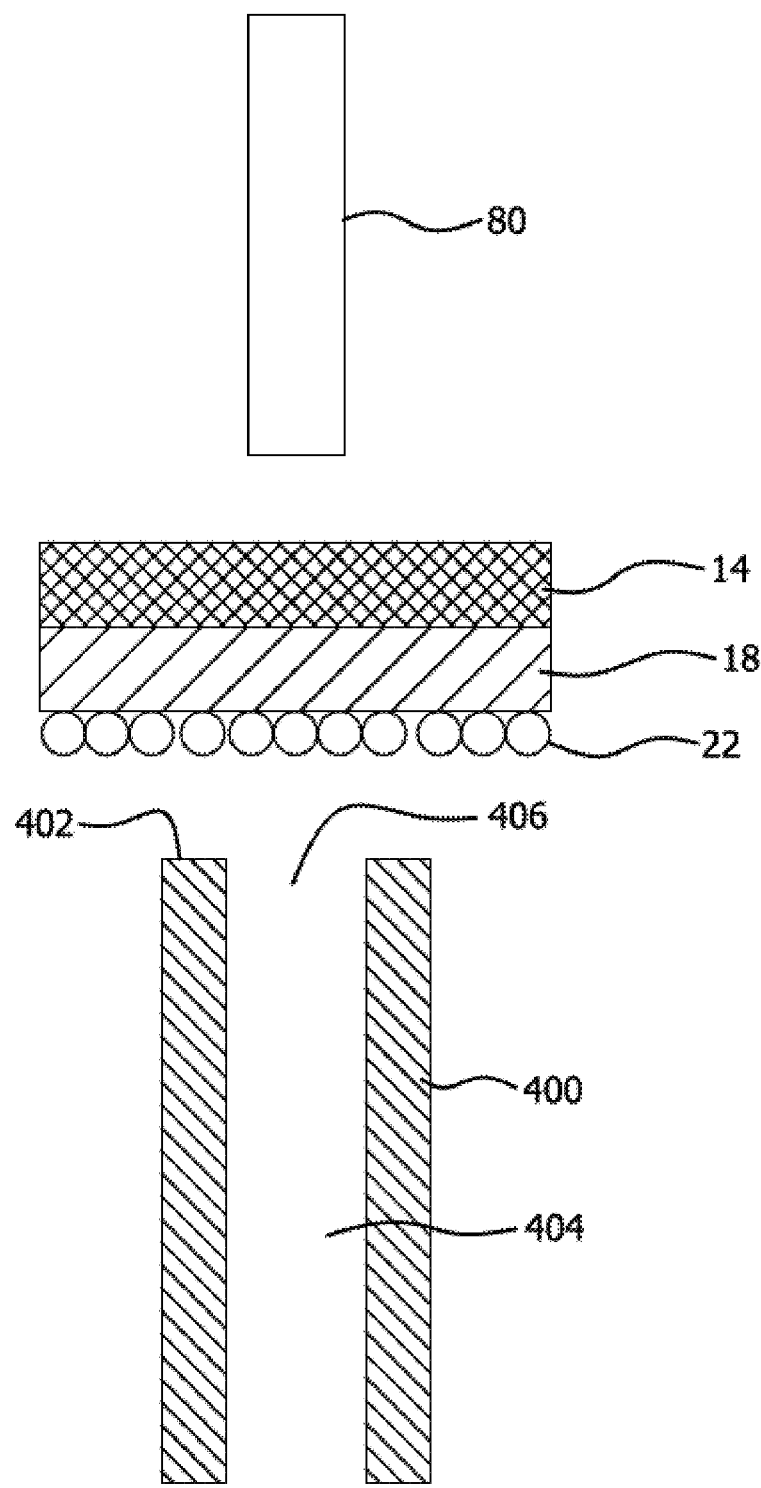
FIG. 28 is a schematic diagram illustrating an initial stage of a static solvent microjunction method according to an alternative embodiment of the invention.
Figure 29:
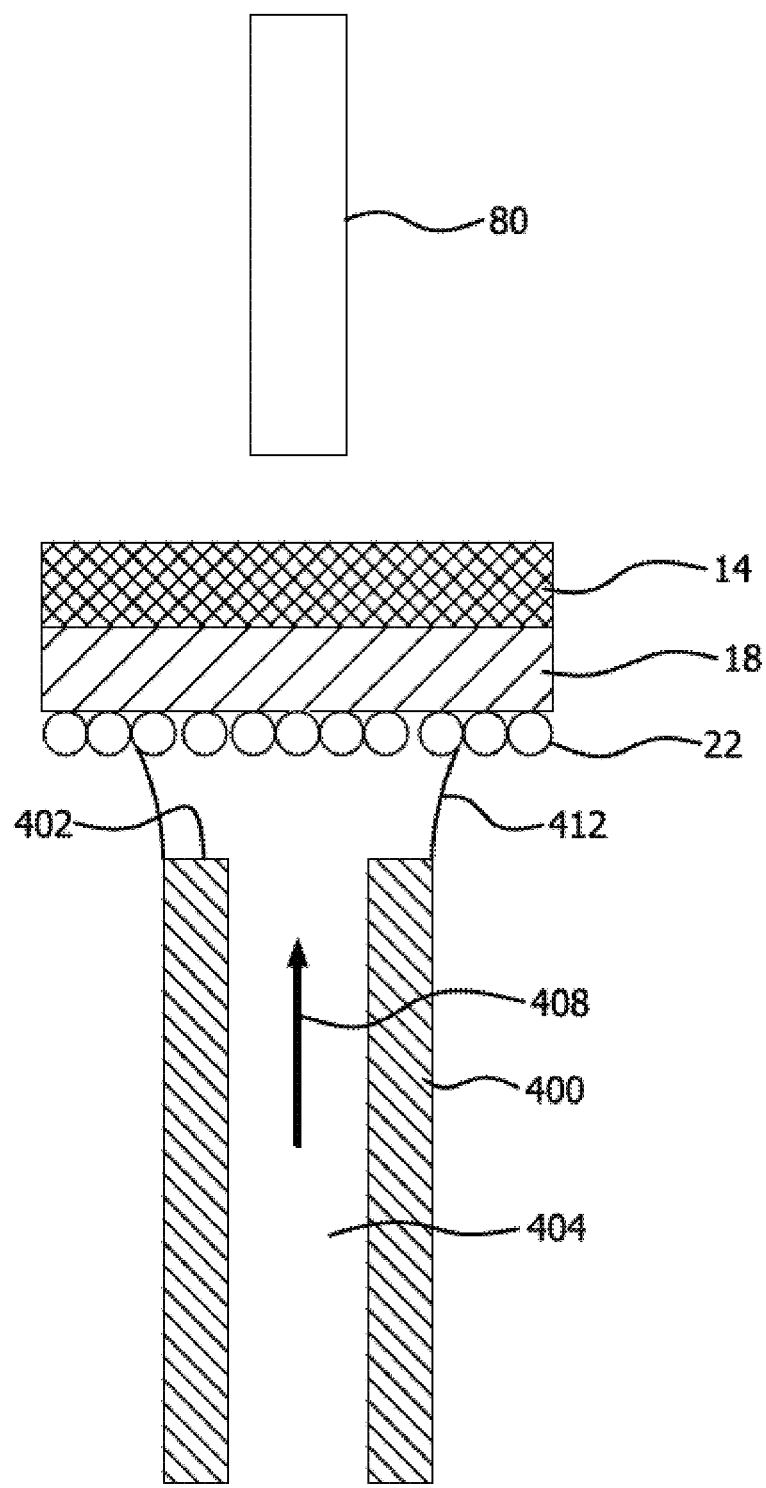
FIG. 29 is a schematic diagram of a $2^{nd}$ step of the static solvent microjunction method.
Figure 30:
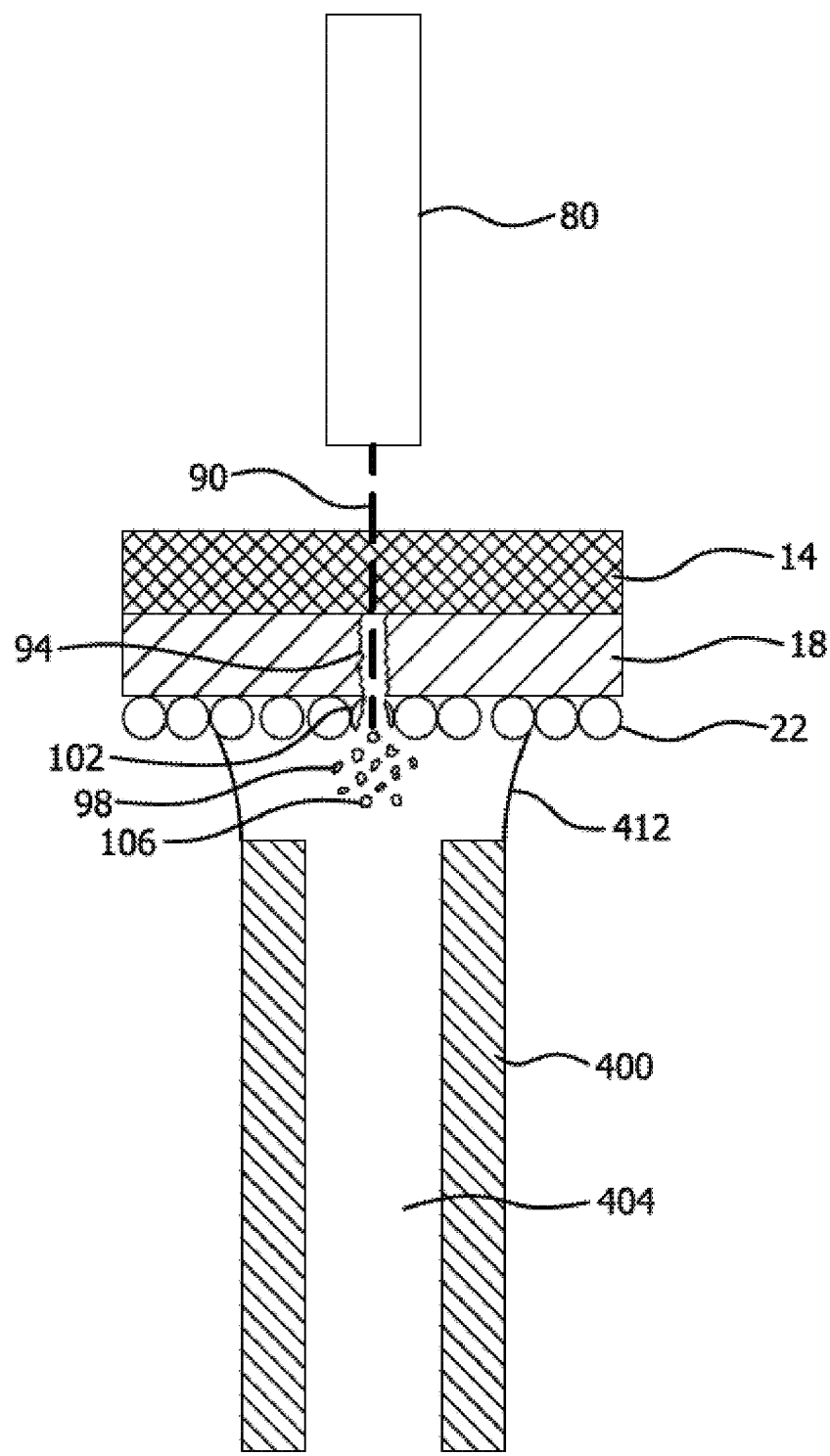
FIG. 30 is a schematic diagram of a $3^{rd}$ step of the static solvent microjunction method.
Figure 31:
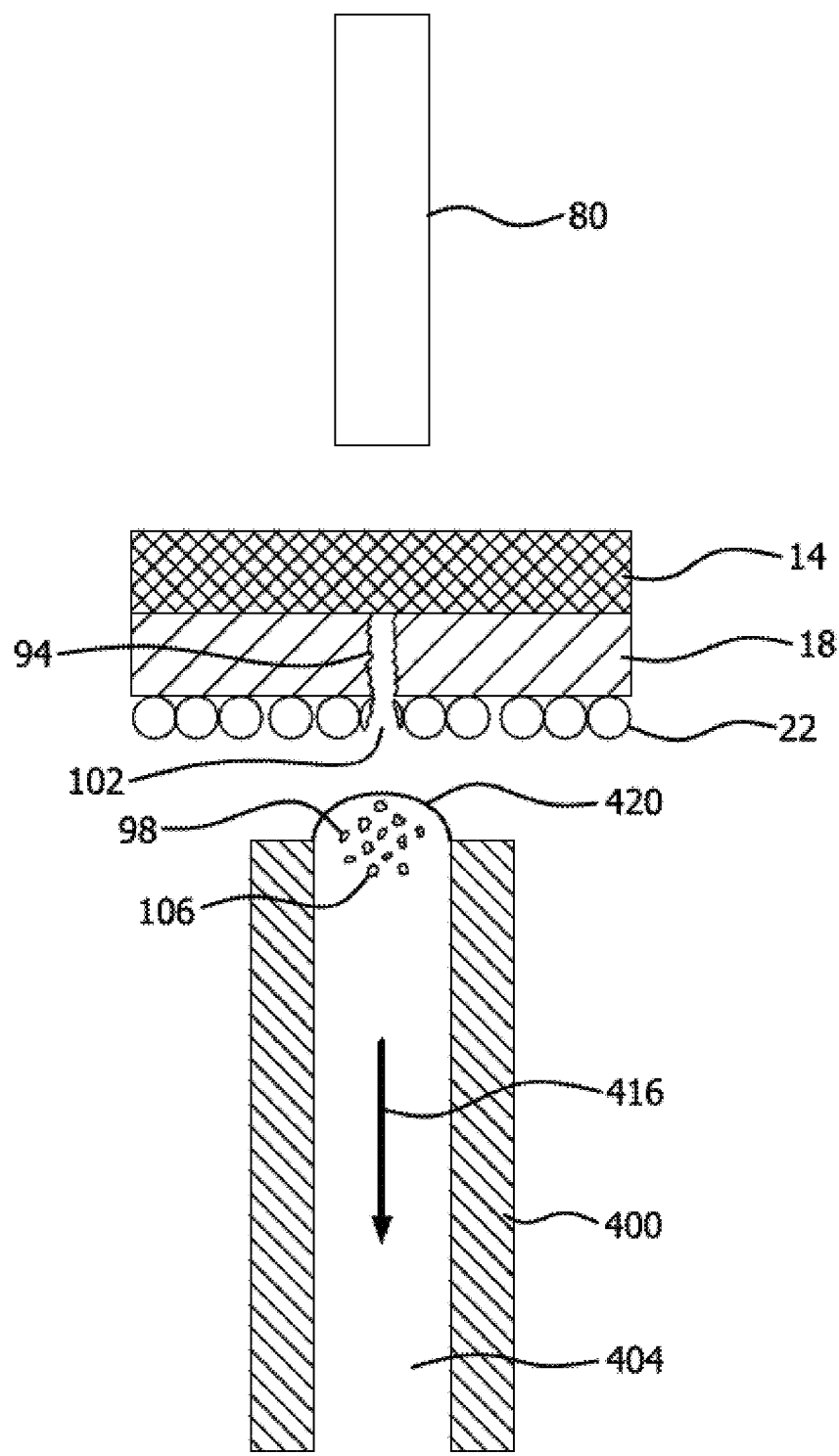
FIG. 31 is a schematic diagram of a $4^{th}$ step of the static solvent microjunction method.

Different configurations and methods of the invention are possible. There is shown in FIGS. 28-31 a configuration and method in which a single capillary, conduit or pipette 400 is operated in a static solvent microjunction method. The conduit 400 has an open interior 404 and an end 402 defining an opening 406. The and 402 is brought into position adjacent the support 14 with the sample 18 and the surface treatment composition coating 22 (FIG. 28). Solvent is caused to flow through the open interior 404 in the direction shown by arrow 408 to form a liquid microjunction 412 with the sample 18 and surface treatment composition coating 22 (FIG. 29). The conduit 400 is thereby operated as a solvent supply conduit. The laser 80 is then operated to generate a laser beam 90 which is transmitted through the support 14 and strikes the sample 18 and surface treatment composition coating 22. Sample 18 is ablated into particles 98 leaving an ablation opening 94. Surface treatment composition 22 is ablated into particles 106 leaving an ablation opening 102. The sample particles 98 and surface treatment composition particles 106 enter the liquid micro junction 412 (FIG. 30). Solvent is withdrawn through the opening 404 of the conduit 400 as indicated by arrow 416. The conduit 400 is thereby operated as an exhaust conduit. Solvent 420 containing the sample particles 98 and surface treatment composition particles 106 is withdrawn with the solvent and can be transported to a chemical analysis device (FIG. 31).

Figure 32:
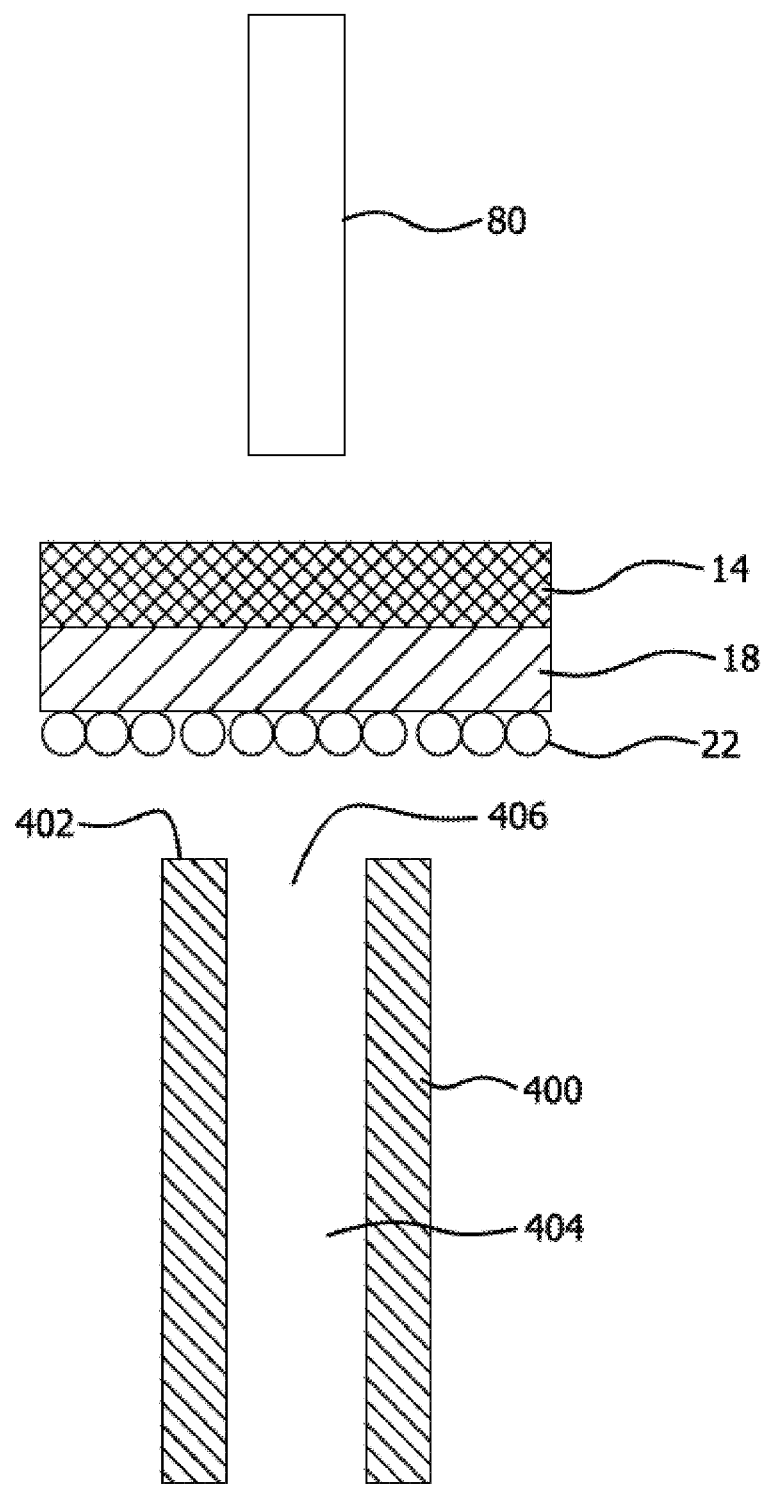
FIG. 32 is a schematic diagram illustrating an initial stage of a deposited solvent droplet method according to an alternative embodiment of the invention.
Figure 33:
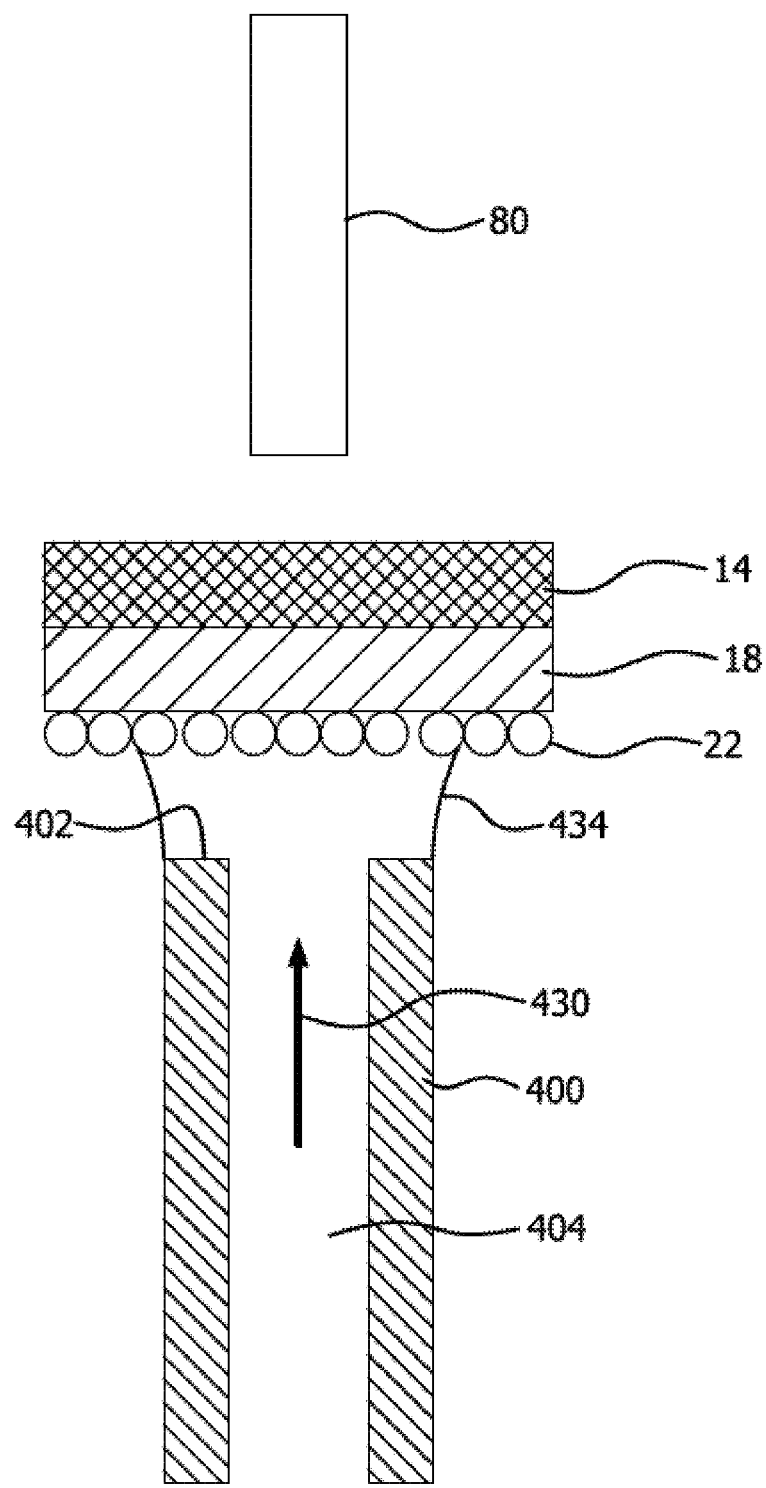
FIG. 33 is a schematic diagram of a $2^{nd}$ step of the deposited solvent droplet method.
Figure 34:
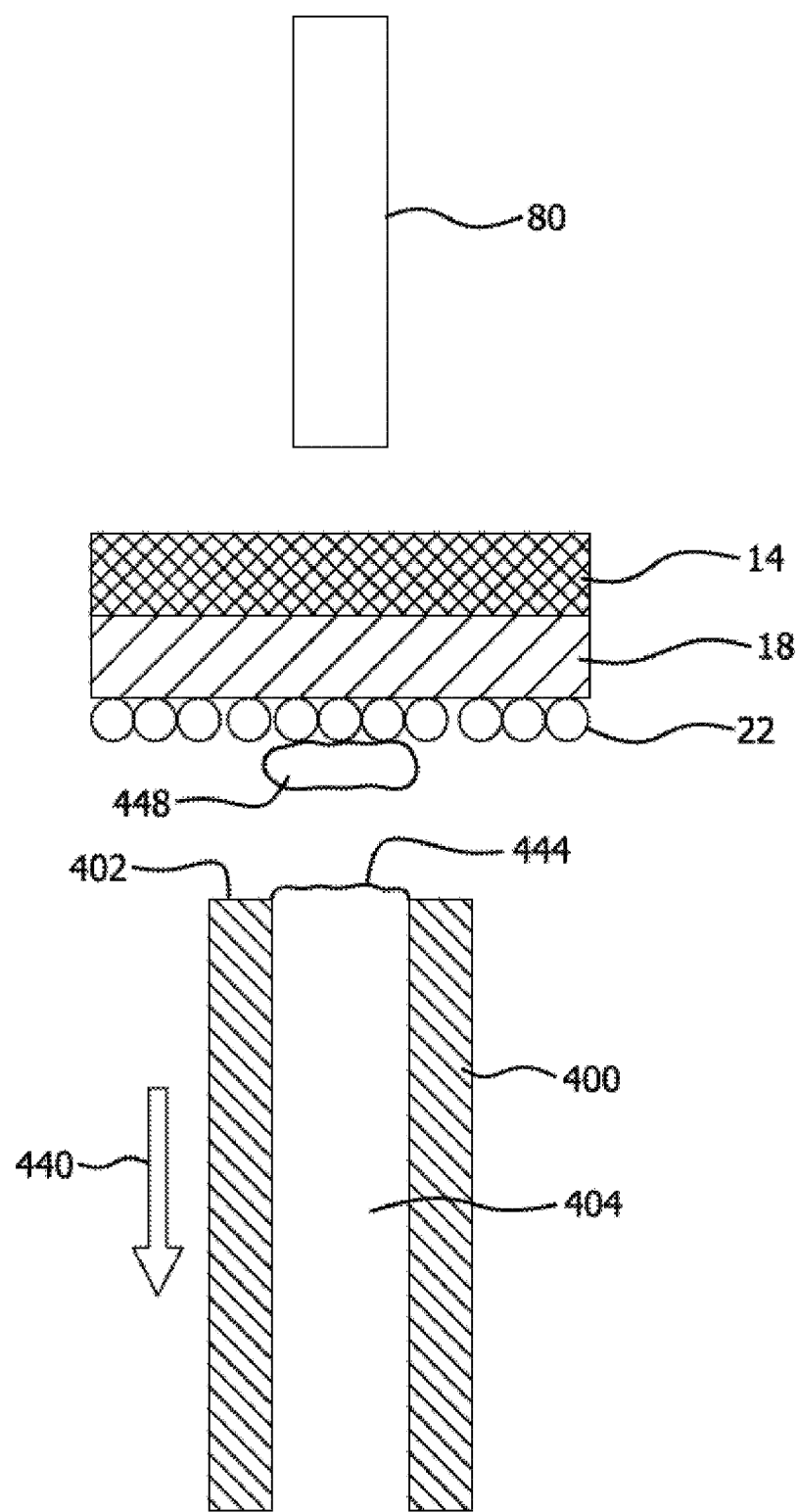
FIG. 34 is a schematic diagram of a $3^{rd}$ step of the deposited solvent droplet method.
Figure 35:
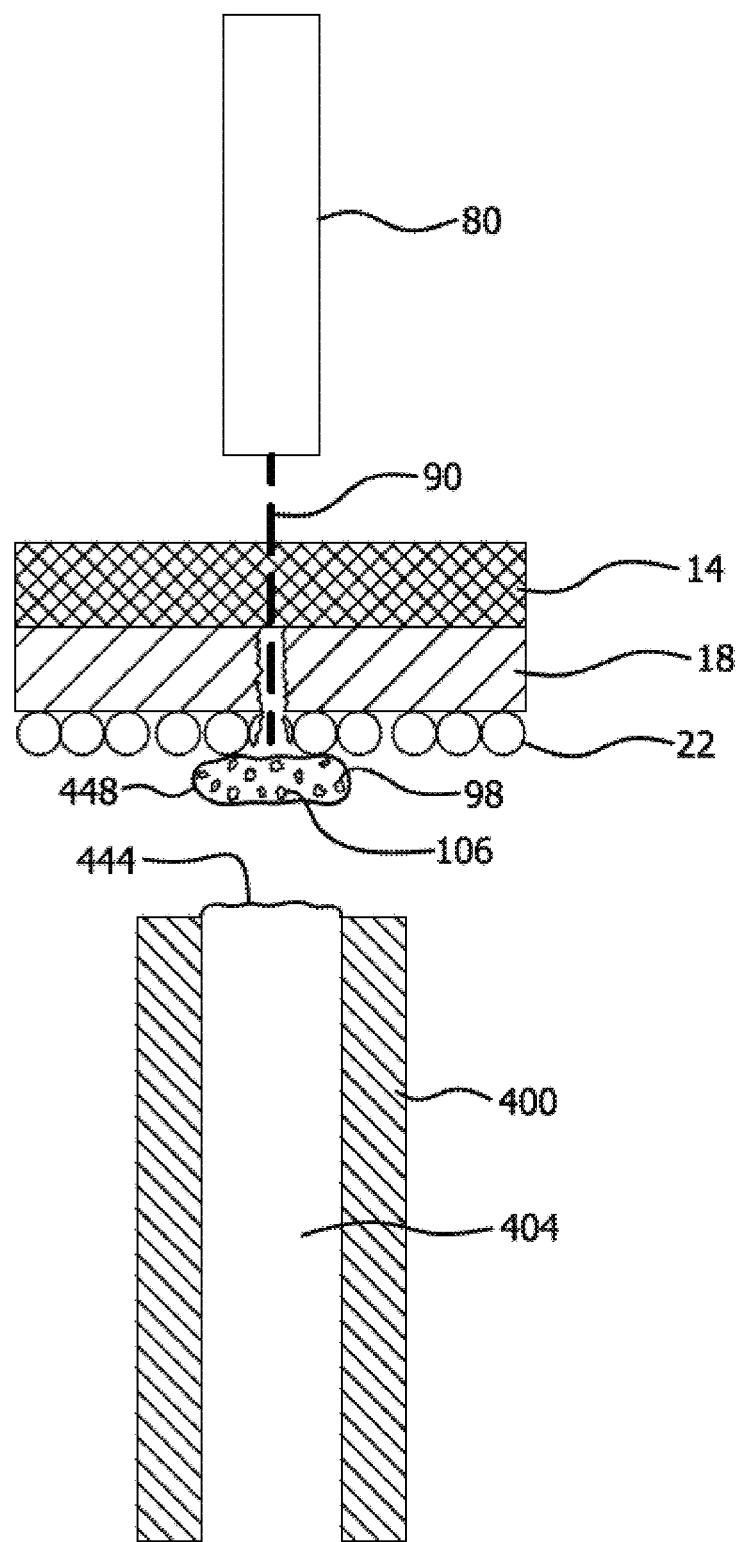
FIG. 35 is a schematic diagram of a $4^{th}$ step of the deposited solvent droplet method.
Figure 36:
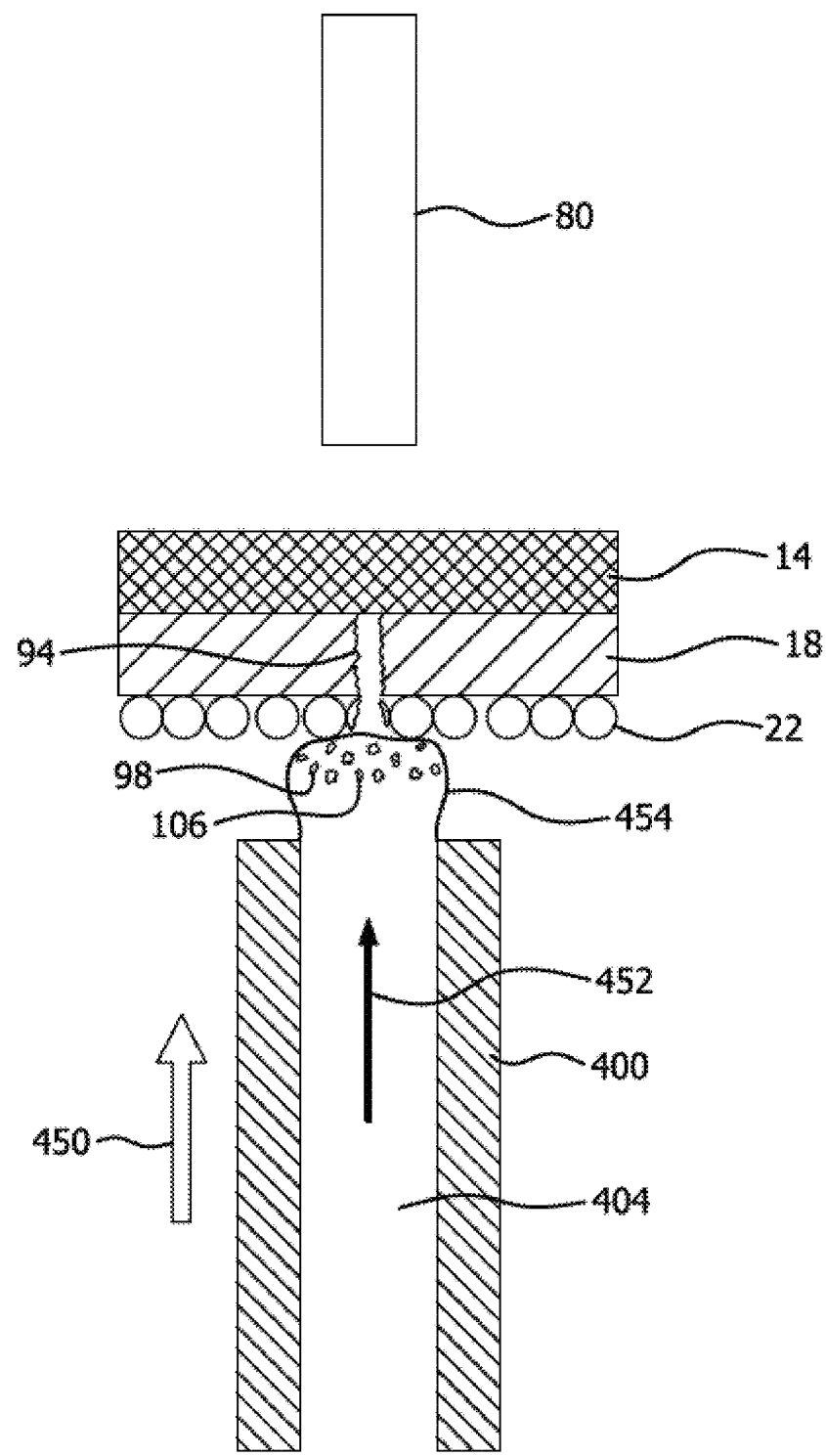
FIG. 36 is a schematic diagram of a $5^{th}$ step of the deposited solvent droplet method.
Figure 37:
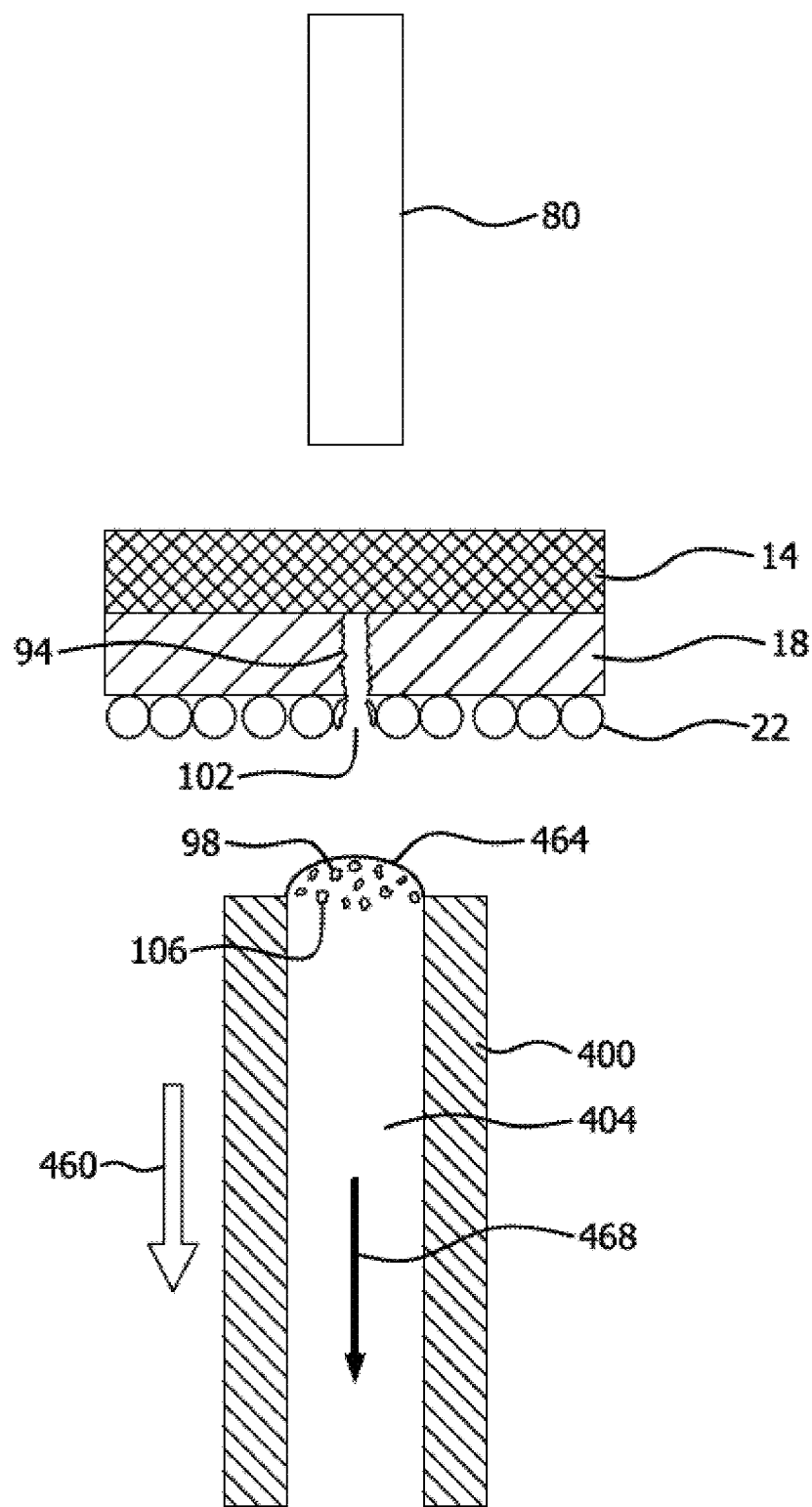
FIG. 37 is a schematic diagram of a 6 step of the deposited solvent droplet method.

There is shown in FIGS. 32-37 a configuration and method in which a single conduit is operated in a deposited solvent method. The conduit 400 including interior opening 404, end 402 and end opening 406 is positioned adjacent the support 14 with the sample 18 and surface treatment composition coating 22 (FIG. 32). Solvent is caused to flow through the open interior 404 as indicated by arrow 430 to form an expelled solvent liquid portion 434 (FIG. 33). The conduit 400 is thereby operated in a solvent supply mode. The conduit 400 is then moved in the direction shown by arrow 440 leave a deposit of solvent 448 with remaining solvent 444 being carried with the conduit 400 (FIG. 34). The laser 80 is then operated to generate a laser beam 90 which ablates the sample 18 leaving an ablation opening 94 and surface treatment composition coating 22 leaving an ablation opening 102 such that particles 98 of the sample 18 and particles 106 of the surface treatment composition 22 enter the solvent droplet 448 (FIG. 35). The conduit 400 is then moved in the direction of arrow 450 and if necessary solvent is supplied through the interior opening 404 as indicated by arrow 452 such that solvent in the interior 404 contacts the droplet 444 to form a liquid junction 454 containing the sample particles 98 and the surface treatment composition particles 106 (FIG. 36). The conduit 400 can then be moved in the direction shown by arrow 460 and solvent removed through the open interior 404 such that sample particles 98 and surface treatment composition particles 106 are withdrawn in removed solvent 464 and can be exhausted as indicated by arrow 468 (FIG. 37). The conduit 400 is thereby operated in an exhaust conduit mode.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A system for sampling a solid sample material, comprising:
    a support for retaining a layer of the sample having an outer sample surface opposite to the support;
    a dry process applicator for applying a layer of a surface treatment composition onto the outer sample surface of the sample layer, wherein the surface treatment composition layer is between 10 nm and 10 µm thick;
    a surface treatment composition source for supplying to the dry process applicator the surface treatment composition, the surface treatment composition being impermeable to the sample;
    a solvent supply conduit for supplying a solvent to the sample and the surface treatment composition;
    a solvent source for supplying the solvent to the solvent supply conduit, the solvent being a weak solvent for the surface treatment composition, and that does not dissolve the surface treatment composition in less than 10 seconds;
    a solvent exhaust conduit for removing solvent and ablated sample from the sample surface;
    a laser source for directing a laser beam to the sample layer and the surface treatment composition layer, wherein the laser beam will ablate the sample and the surface treatment composition in portions intersected by the laser beam, and ablated sample material will be transported with the solvent through the solvent exhaust conduit; and,
    further comprising a processor for controlling the position of the support relative to the solvent supply conduit and the laser source.

2. The system of claim 1, wherein the processor is configured to record the position of the support relative to the laser source.

3. The system of claim 1, wherein the processor is configured to detect and record a solvent-containing sample with a particular sample.

4. The system of claim 1, wherein the solvent supply conduit and the solvent exhaust conduit are tubular, and the solvent supply conduit and the solvent exhaust conduit are provided by concentric tubes in a capture probe.

5. The system of claim 4, wherein the solvent flow path in the capture probe is configured such that solvent will flow continuously from the solvent supply conduit to the solvent exhaust conduit and will form a liquid microjunction with the sample surface.

6. The system of claim 1, wherein the solvent supply conduit and the solvent exhaust conduit are a single tube with positive pressure applied for solvent supply and more negative pressure applied for solvent exhaust.

7. The system of claim 1, wherein the dry process applicator is at least one selected from the group consisting of a dry liftoff and redeposition applicator, an atomic layer deposition applicator, a molecular layer deposition applicator, and a chemical vapor deposition applicator.

8. The system of claim 1, wherein the support comprises a transparent portion, the laser being directed through the transparent portion of the support.

9. The system of claim 8, wherein the transparent portion comprises at least one selected from the group consisting of glass, poly(carbonate), quartz, and a thin membrane.

10. The system of claim 1, further comprising an analysis device for analyzing the sample-containing solvent, wherein the analysis device comprises at least one selected from the group consisting of a mass spectrometer, a proteinase chain reaction (PCR) device, and high performance liquid chromatography.

11. The system of claim 1, wherein the processor is configured to move the support relative to the laser source to a second location on the sample surface, to then operate the laser source to generate a laser beam to ablate sample material from the second location, and then to withdraw the solvent and ablated sample into the solvent exhaust conduit.

12. The system of claim 1, wherein the system is configured to deposit solvent through the solvent supply conduit as a droplet after which solvent flow is ceased, then to operate the laser source to generate a laser beam to ablate the sample and the surface treatment composition into the droplet, and then to remove the droplet containing the ablated sample and surface treatment composition through the solvent exhaust conduit.

13. The system of claim 1, wherein the surface treatment composition comprises at least one selected from the group consisting of gold, chromium, parylene-C, parylene-N, poly(tetrafluoroethylene), poly(divinyl benzene), poly(trivinyl-trimethyl cyclotrisiloxane), poly(dimethylaminomethyl styrene), poly(meta-diethynylbenzene), and poly(thiophene).

* * * * *